(12) United States Patent
Ohyama et al.

(10) Patent No.: US 9,392,388 B2
(45) Date of Patent: Jul. 12, 2016

(54) NOISE IDENTIFYING APPARATUS AND NOISE IDENTIFYING METHOD USING THE SAME

(71) Applicant: NITTOBO ACOUSTIC ENGINEERING CO., LTD., Tokyo (JP)

(72) Inventors: Hiroshi Ohyama, Tokyo (JP); Taichi Higashioka, Tokyo (JP); Kazuhiro Takashima, Tokyo (JP); Shinji Ohashi, Tokyo (JP); Yoshio Tadahira, Tokyo (JP)

(73) Assignee: NITTOBO ACOUSTIC ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 14/415,473

(22) PCT Filed: Jul. 11, 2013

(86) PCT No.: PCT/JP2013/068929
§ 371 (c)(1),
(2) Date: Jan. 16, 2015

(87) PCT Pub. No.: WO2014/013924
PCT Pub. Date: Jan. 23, 2014

(65) Prior Publication Data
US 2015/0208185 A1 Jul. 23, 2015

(30) Foreign Application Priority Data
Jul. 19, 2012 (JP) .................................. 2012-160433

(51) Int. Cl.
*H04R 29/00* (2006.01)
*H04S 7/00* (2006.01)
*G01H 3/00* (2006.01)
*G10L 21/028* (2013.01)

(52) U.S. Cl.
CPC .............. *H04R 29/00* (2013.01); *H04R 29/005* (2013.01); *H04S 7/303* (2013.01); *G01H 3/00* (2013.01); *G10L 21/028* (2013.01); *H04S 2400/11* (2013.01)

(58) Field of Classification Search
CPC ................................. H04N 11/00; G01H 3/14
USPC ........................................................... 381/56
See application file for complete search history.

(56) References Cited

U.S. PATENT DOCUMENTS

2001/0007969 A1* 7/2001 Mizushima ........... G01S 3/8086
   702/76
2011/0075860 A1   3/2011 Nakagawa et al.

FOREIGN PATENT DOCUMENTS

| JP | 9-218254 A    | 8/1997  |
| JP | 2001-166025 A | 6/2001  |
| JP | 2004-269256 A | 9/2004  |
| JP | 2006-38772 A  | 2/2006  |
| JP | 2010-11433 A  | 1/2010  |

OTHER PUBLICATIONS

International Search Report, issued in PCT/JP2013/068929, dated Sep. 10, 2013.

\* cited by examiner

*Primary Examiner* — Simon King
(74) *Attorney, Agent, or Firm* — Birch, Stewart, Kolasch & Birch, LLP

(57) ABSTRACT

Provided is a noise identifying apparatus and noise identifying method, allowing automatic identification of whether or not a measured noise has been influenced by a non-object noise, using a simple system.

Apparatus includes a sound detection unit, including plural microphones and/or particle velocity sensors; a sound source direction specifying unit, specifying an instantaneous direction of a sound source for each unit time, on the result of detection by the sound detection unit; a variation degree calculating unit, calculating a variation degree of the plural instantaneous directions specified by the sound source direction specifying unit for a prescribed period set longer than the unit time; and a non-object noise determining unit, determining the existence/absence of a non-object noise having influenced the measurement of an object noise taken as an object to be measured, coming from a noise source, on the variation degree calculated by the variation degree calculating unit.

7 Claims, 28 Drawing Sheets

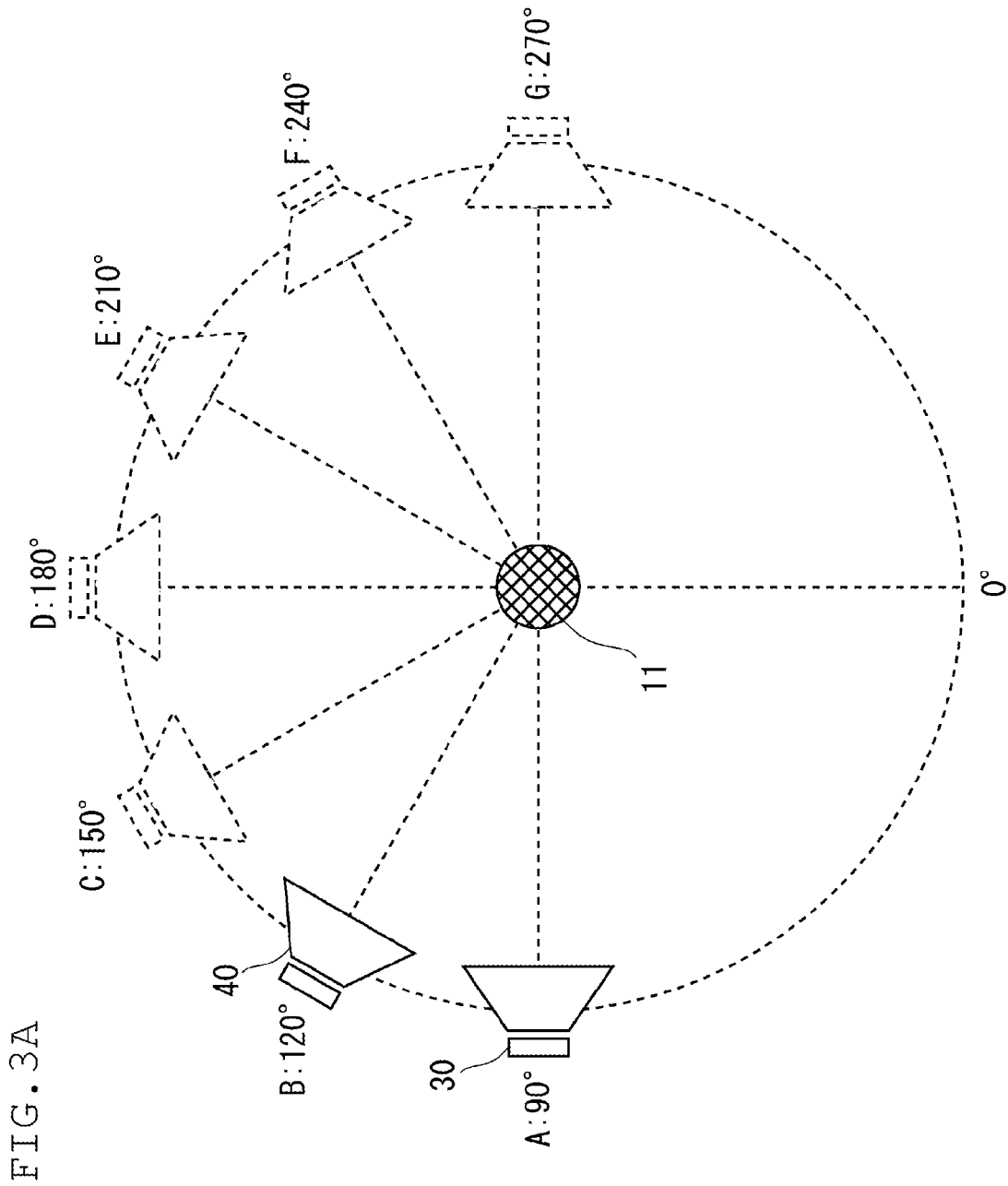

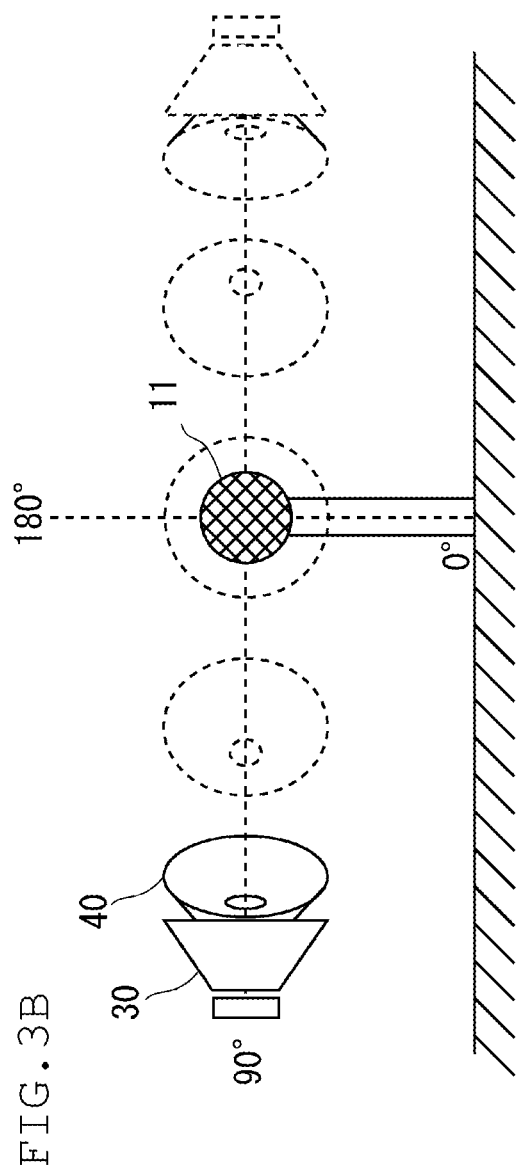

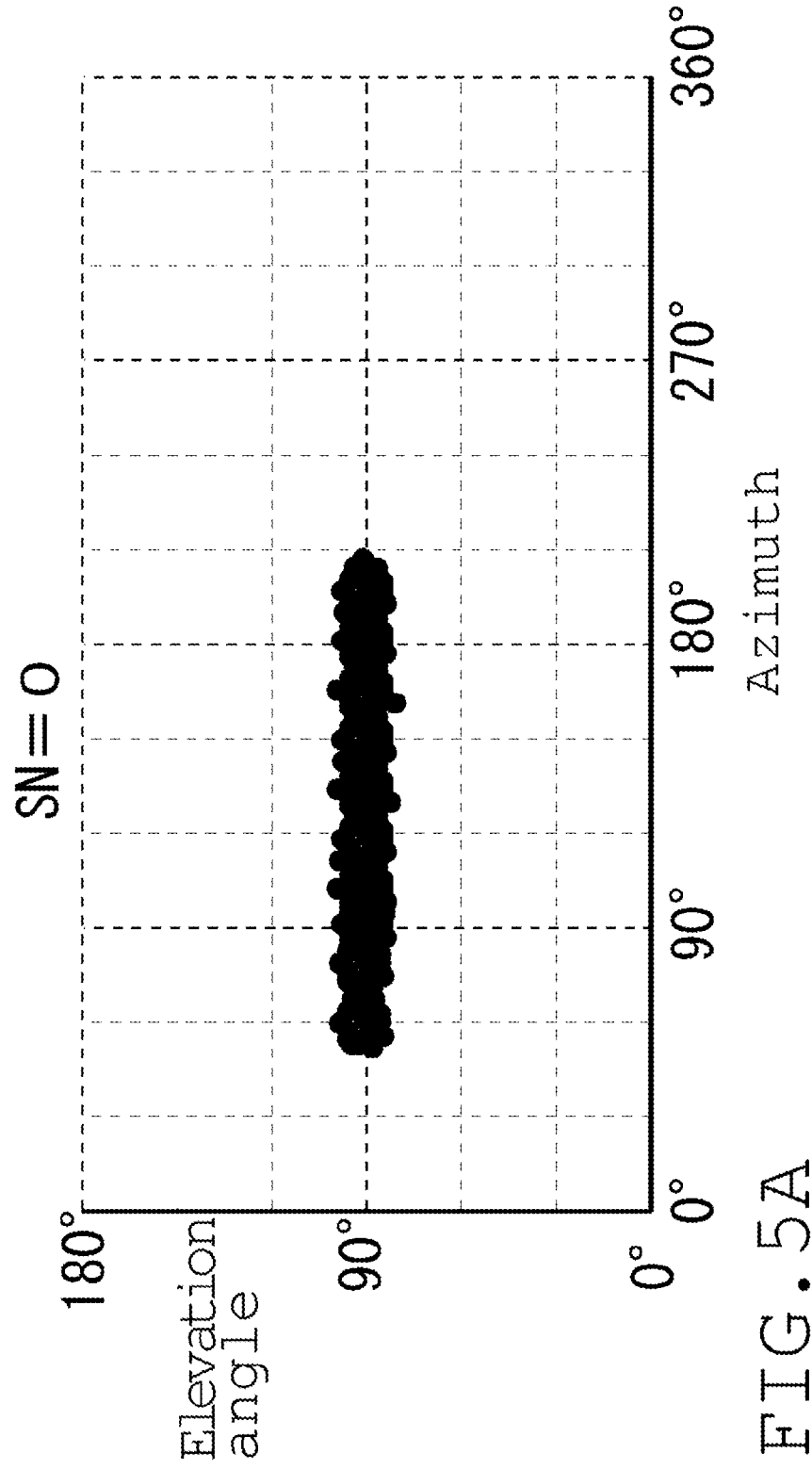

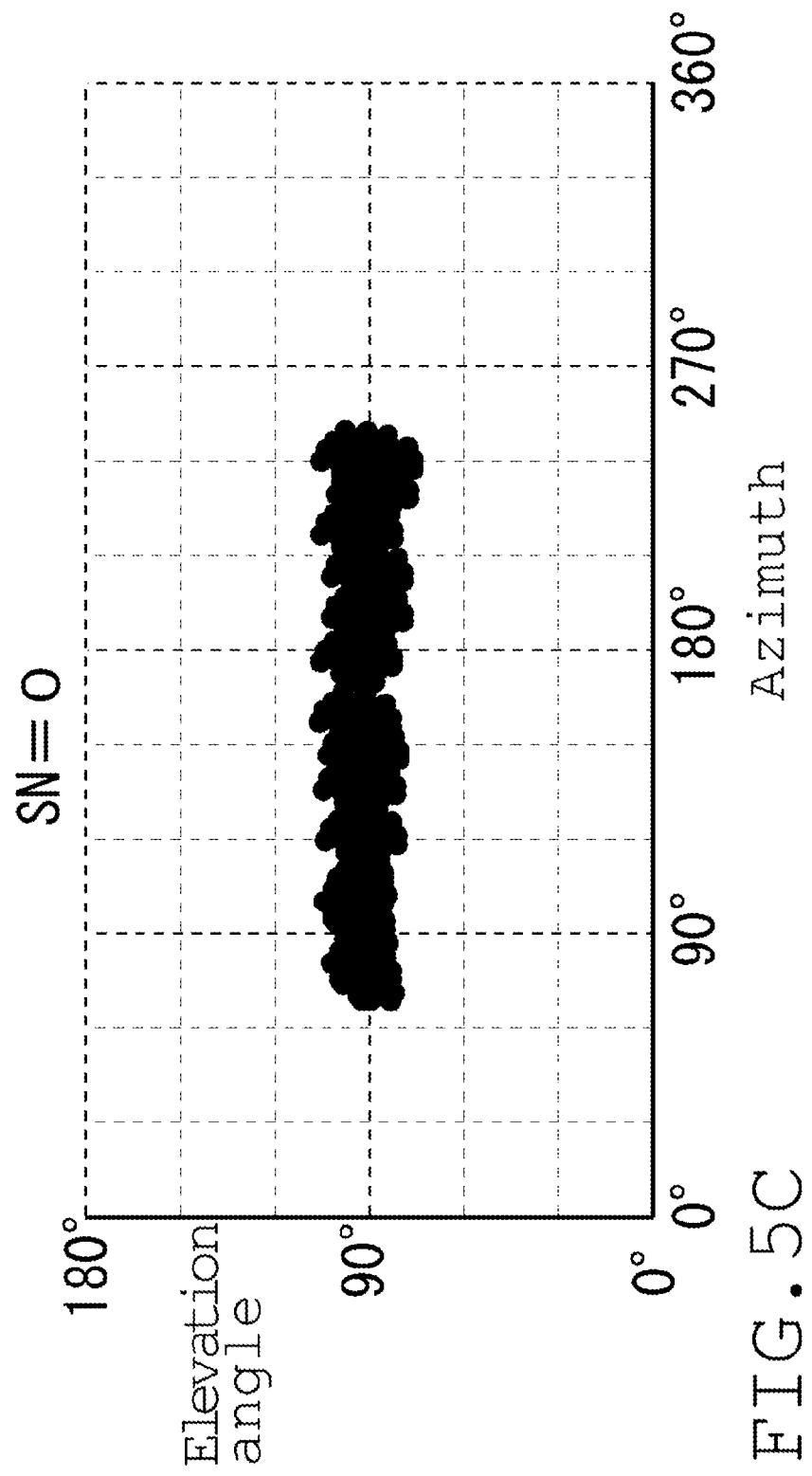

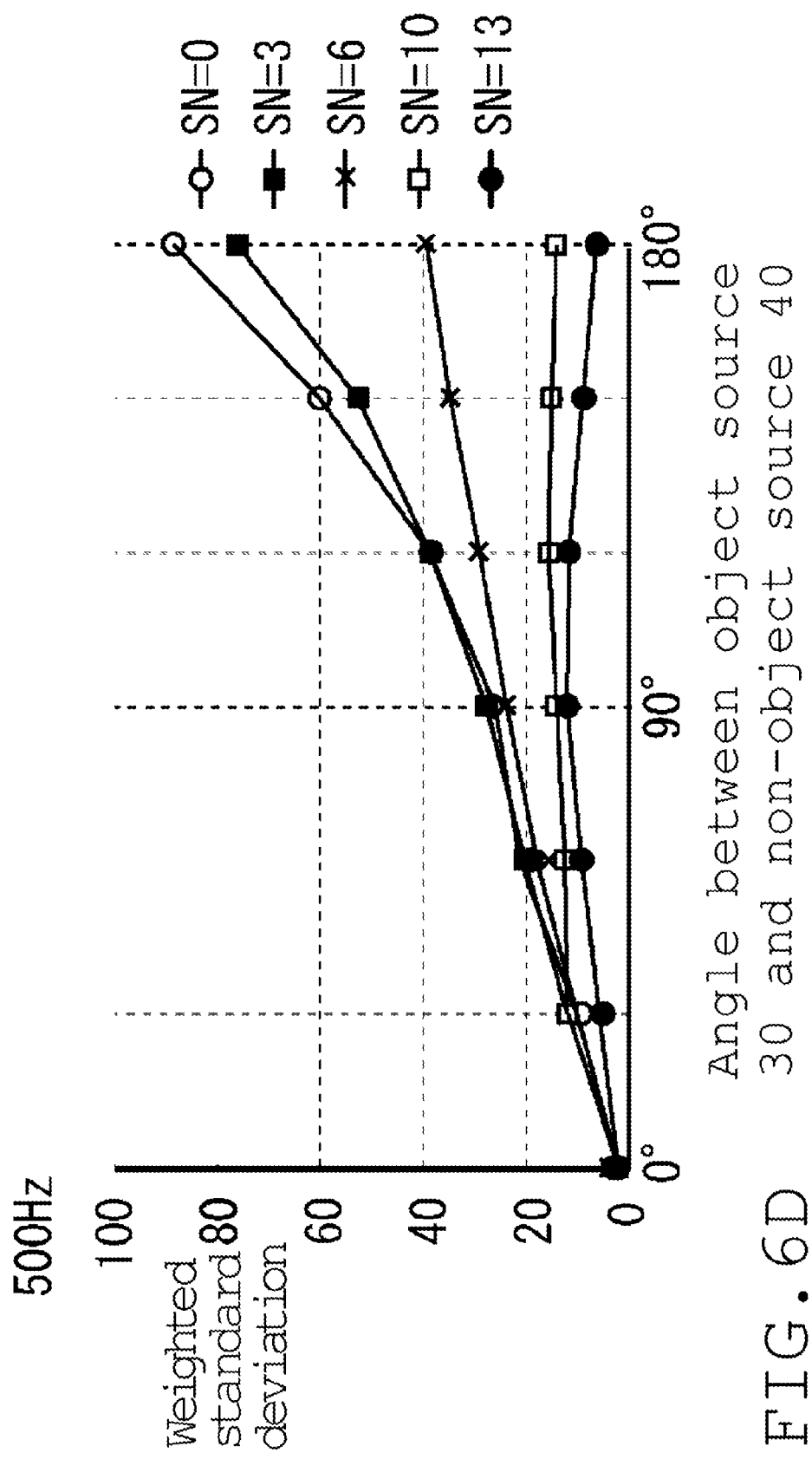

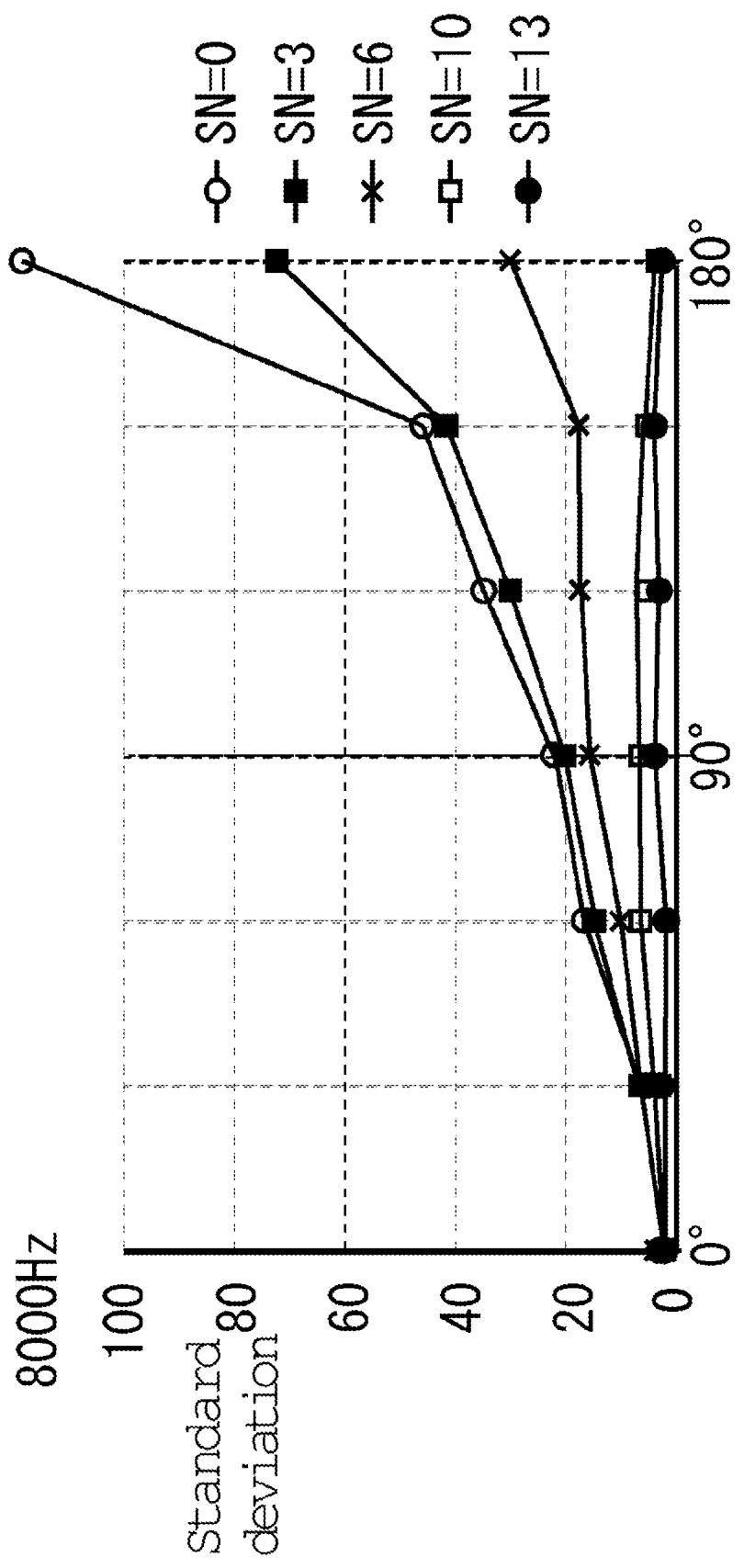

NOISE IDENTIFYING APPARATUS AND NOISE IDENTIFYING METHOD USING THE SAME

TECHNICAL FIELD

The present invention relates to a noise identifying apparatus for identifying a noise coming from a noise source taken as an object to be measured, and a noise identifying method using the same.

BACKGROUND ART

In the evaluation manual for the environmental standards related to noise that have been set forth by the Ministry of the Environment, it is stated that, in measuring a noise coming from a noise source taken as an object to be measured (hereinbelow, to be called an object noise), a noise which comes from a noise source other than the object to be measured and becomes an obstacle to the measurement (hereinbelow, to be called a non-object noise) should be excluded. For example, according to a partial revision of the "Environmental Standards Related to Aircraft Noise" (Notification of the Ministry of Environment, No. 114, Dec. 17, 2007), after Apr. 1, 2013, the aircraft noise will be evaluated by the time zone-corrected equivalent noise level (Lden), which is an evaluation scale based on the equivalent noise level. In order to exactly measure this equivalent noise level for an aircraft, it is necessary to assure that any noise other than that coming from the aircraft which is a noise source taken as an object to be measured will not influence the measured value.

If, at a noise measurement site, an object noise exceeds a non-object noise by 10 dB or over, the measurement of the object noise is not influenced by the non-object noise, and thus can be easily carried out. However, at an actual noise measurement site, there is always a mixture of incoming sounds from a great variety of noise sources. For example, in the case where, during the measurement of an equivalent noise level, there occurs a non-object noise other than the aircraft noise taken as an object noise to be measured, influencing the measured value, in other words, in the case where the noise level of a non-object noise other than the aircraft noise taken as an object is high, resulting in the noise level for the aircraft not exceeding the noise level of the non-object noise by 10 dB or over (the S/N ratio being under 10 dB), the pertinent measured value must be deleted. Therefore, generally, in performing a noise measurement/evaluation, it is essential that a measurement stuff monitor the actual noise on site, or trial listen the recorded noise, to make a noise identification operation for identifying a non-object noise which will influence the measured value, being mixed therein, and the time and effort required for such noise identification operation is huge. In addition, identification of a noise involves an evaluation based on the subjectivity of the noise identifying person, thereby an uncertainty being produced.

Then, the present applicant has proposed a noise identification technique which uses a sound source survey device, including a spherical baffle microphone, to observe/specify an incoming direction of a sound from a plurality of respective sound sources, and uses a sound source analysis device to associate a measured noise with the plurality of sound sources, thereby grasping an incoming noise included in the measured noise for each of the sound sources (refer to, for example, Patent Document 1).

CITATION LIST

Patent Literature

Patent Document 1: Japanese Patent Application Laid-open No. 2004-269256

DISCLOSURE OF THE INVENTION

Problems to be Solved by the Invention

According to the conventional noise identification technique, an incoming noise for each sound source can be grasped, whereby identification between an object noise and a non-object noise can be automatically performed, however, there is presented a problem that the system is complicated and expensive, and an expertise is required for maintenance work.

The present invention has been made in view of such a problem, and it is intended to provide a noise identifying apparatus which is capable of automatically identifying whether or not a measured noise has been influenced by a non-object noise, using a simple system, and a noise identifying method using the same.

Means for Solving the Problems

The noise identifying apparatus of the present invention is a noise identifying apparatus, including:

a sound detection means, including a plurality of microphones and/or particle velocity sensors;

a sound source direction specifying means, specifying an instantaneous direction of a sound source for each unit time on the basis of the result of detection by the sound detection means;

a variation degree calculating means, calculating a variation degree of a plurality of the instantaneous directions, having been specified by the sound source direction specifying means for a prescribed period, being set longer than the unit time; and a non-object noise determining means, determining, on the basis of the variation degree, having been calculated by the variation degree calculating means, the existence/absence of a non-object noise, having influenced the measurement of an object noise, coming from a noise source taken as an object to be measured.

Further, for the noise identifying apparatus of the present invention, the non-object noise determining means may be adapted such that it, upon having determined that there has existed the non-object noise which has influenced the measurement of the object noise, outputs the prescribed period, the variation degree therefor having been calculated as a non-object noise detection period by the variation degree calculating means.

Further, for the noise identifying apparatus of the present invention, the sound source direction specifying means may be adapted such that it specifies a piece of sound pressure information together with the instantaneous direction, while the variation degree calculating means calculates a weighted standard deviation including the piece of sound pressure information as the variation degree.

Further, for the noise identifying apparatus of the present invention, the variation degree calculating means may be adapted such that it generates a distribution map of the instantaneous direction, calculating a correlation coefficient between the map and a reference distribution map, having been previously set, as the variation degree.

In addition, the noise identifying method of the present invention is a noise identifying method, including:

the sound detection step of detecting a sound by a sound detection means, including a plurality of microphones and/or particle velocity sensors; and the determination step of using an information processing apparatus for specifying an instantaneous direction of a sound source for each unit time on the basis of the result of detection by the sound detection step; calculating a variation degree of a plurality of the instantaneous directions, having been specified by specifying an instantaneous direction of the sound source for a prescribed period, being set longer than the unit time; and on the basis of the variation degree, having been calculated, determining the existence/absence of a non-object noise, having influenced the measurement of an object noise, coming from a noise source taken as an object to be measured.

Advantages of the Invention

The present invention allows the existence/absence of a non-object noise which has influenced the measurement of an object noise to be determined with no need for a sound source identifying person making a sound source identification by trial listening, or an on-site sound source identification between a sound source of an object noise and a sound source of a non-object noise, and thus there is provided an advantage that whether the measured noise has been influenced by a non-object noise can be automatically identified with a simple system.

BRIEF DESCRIPTION OF THE DRAWINGS

FIG. 3A and FIG. 3B are figures illustrating an example of verification experiment for verifying the nature possessed by a variation degree which is calculated by a variation degree calculating unit shown in FIG. 1;

FIG. 5A to FIG. 5D are graphs each showing a variation in instantaneous direction in the verification experiment shown in FIG. 3A and FIG. 3B;

FIG. 6A to FIG. 6D are graphs each showing a relationship between the variation degree (weighted standard deviation) calculated in the verification experiment shown in FIG. 3A and FIG. 3B and a particular S/N ratio;

FIG. 10A to FIG. 10D are graphs each showing a relationship between the variation degree (weighted standard devia-tion) calculated in the verification experiment shown in FIG. 3A and FIG. 3B and a particular S/N ratio.

BEST MODE FOR CARRYING OUT THE INVENTION

Figure 1:
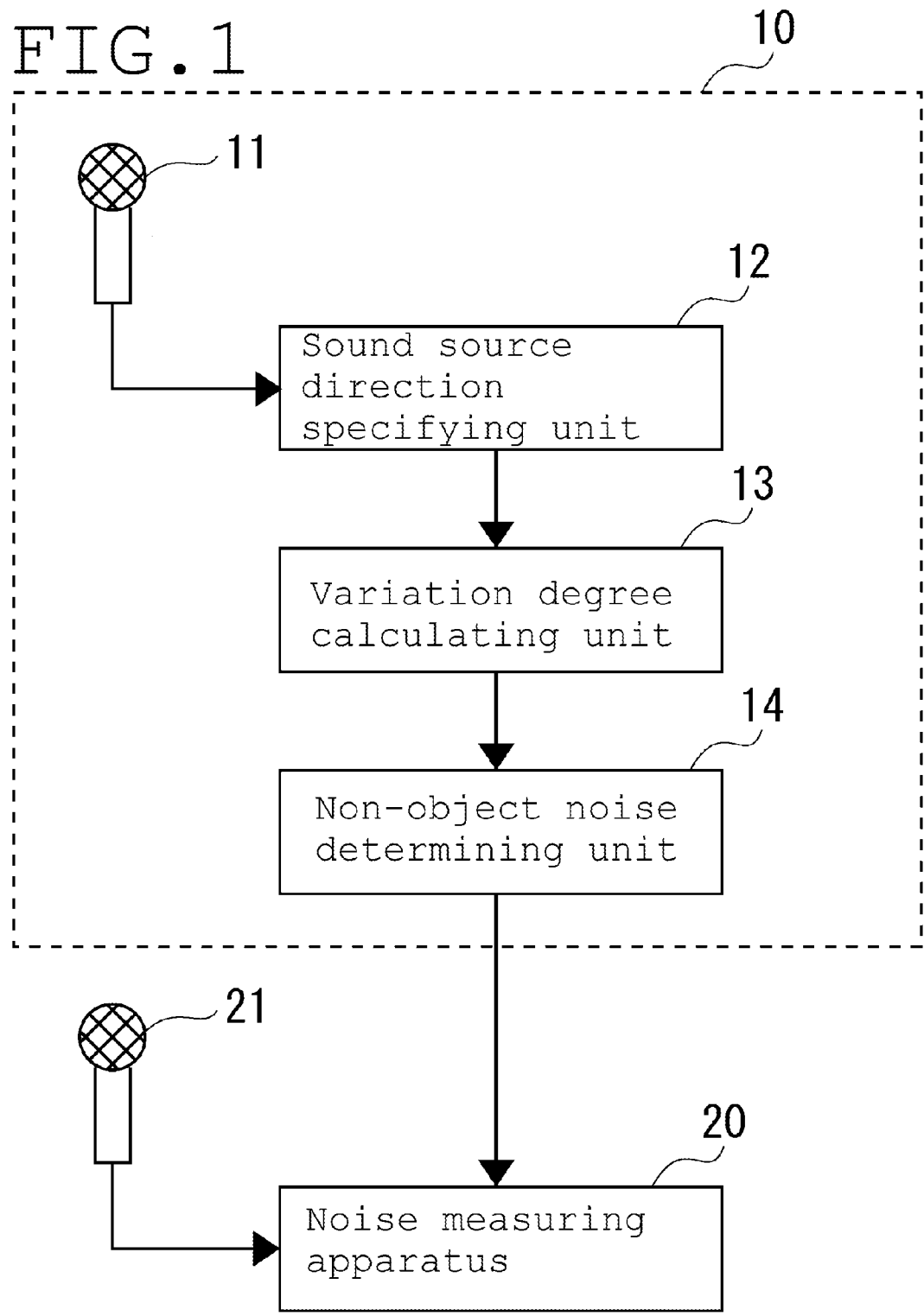
FIG. 1 is a block diagram illustrating the configuration of an embodiment of a noise identifying apparatus in accordance with the present invention.

Next, an embodiment of the present invention will be specifically explained with reference to the drawings. A noise identifying apparatus 10 of the present embodiment is used with a noise measuring apparatus 20 for measuring a noise, and notifies the noise measuring apparatus 20 of a non-object noise detection period in which there has existed a non-object noise, in other words, a noise coming from a noise source other than the noise source taken as an object to be measured has become an obstacle to the measurement. Referring to FIG. 1, the noise identifying apparatus 10 includes a sound detection unit 11, a sound source direction specifying unit 12, a variation degree calculating unit 13, and a non-object noise determining unit 14.

The sound detection unit 11 is a sound pressure detection means which includes a plurality of microphones and/or particle velocity sensors, making a conversion of a detection signal outputted from the respective microphones and/or particle velocity sensors into a signal of an appropriate high frequency (such as 48 kHz) before outputting it; a sound pressure which has been detected by the microphone, or a particle velocity which has been detected by the particle velocity sensor is outputted. As the sound detection unit 11, for example, an acoustic intensity probe of P-P type or C-C type in which two microphones are arranged adjacently can be used. With this type of acoustic intensity probe, one acoustic intensity probe allows the acoustic intensity in one direction to be calculated, and in the case where the acoustic intensity in the three-dimensional direction is to be calculated, a three-axis acoustic intensity probe in which three acoustic intensity probes are disposed in the x, y, and z directions with the center (the middle point of a line segment connecting between the two microphones) being made the same is used. In addition, as the sound detection unit 11, an acoustic intensity probe in which a microphone is disposed at each of a plurality of points which are not given in one plane, for example, an acoustic intensity probe in which a microphone is disposed at each of the apexes of a regular tetrahedron, or an acoustic intensity probe in which a microphone is disposed at adjacent four points (0, x, y, z) on the axes of rectangular coordinates can be used. Further, as the sound detection unit 11, an acoustic probe in which a microphone is combined with a particle velocity sensor (such as a P-U acoustic intensity probe in which a microphone and a particle velocity sensor are placed in substantially the same location) can also be used.

The sound source direction specifying unit 12, the variation degree calculating unit 13, and the non-object noise determining unit 14 are constituted by an information processing apparatus, such as a computer, which is operated under the control of a program. The sound source direction specifying unit 12 specifies a piece of vector information which is comprised of an instantaneous direction of the sound source and a piece of sound pressure information for each unit time on the basis of the output from the sound detection unit 11. The instantaneous direction of a sound source is the direction of a sound source in a unit time when viewed from the sound detection unit 11, and the sound source direction specifying unit 12 regards the sound pressure and the particle velocity which have been detected by the sound detection unit 11 as those which are attributable to a single sound source, thereby specifying only one direction as an instantaneous direction of the sound source. In addition, the piece of sound pressure information provides scaler quantities of the sound pressure (p), the sound pressure level (LP), the noise level, which is an A-weighted sound pressure level, and the like, which represent the loudness. Therefore, with the sound detection unit 11 which includes an acoustic intensity probe, the sound source direction specifying unit 12 specifies an acoustic intensity, and with the sound detection unit 11 which includes a microphone disposed at each of a plurality of points, the sound source direction specifying unit 12 uses the proximity four-point method or the regular tetrahedron apex method to specify an instantaneous direction of the sound source from the time difference between sounds reaching the plurality of microphones.

The sound source direction specifying unit 12 samples an output signal from the sound detection unit 11 at a prescribed period, and on the basis of the sampled data, specifies an instantaneous direction of the sound source and a piece of sound pressure information. Therefore, the unit time for which an instantaneous direction of the sound source and a piece of sound pressure information are specified is set to an integral multiple of the sampling period. For example, in the case where the unit time and the sampling period are 0.01 second, 100 sets of instantaneous direction of the sound source and piece of sound pressure information are specified per 1 sec.

The variation degree calculating unit 13 accumulates a prescribed number of sets of instantaneous direction of the sound source and piece of sound pressure information which have been specified by the sound source direction specifying unit 12, and on the basis of the plurality of sets of instantaneous direction of the sound source and piece of sound pressure information, calculates a variation degree of the sound source direction. The variation degree of the sound source direction is a numerical value which indicates what degree of variation is possessed by the instantaneous direction of the sound source that has been detected/specified for each unit time in a prescribed period which has been set. As described later, the present embodiment is configured such that, as the variation degree, a weighted standard deviation including the piece of sound pressure information is calculated, however, it may be configured such that, for example, a standard deviation based on only the instantaneous direction of the sound source is calculated without performing the weighting. In addition, a distribution map of the instantaneous direction of the sound source is generated, and a correlation coefficient between the map and a reference distribution map which has been previously set may be calculated as a variation degree.

The non-object noise determining unit 14 determines whether or not the variation degree which has been calculated by the variation degree calculating unit 13 is greater than a threshold which has been set, and if the variation degree is greater than the threshold, the non-object noise determining unit 14 notifies the noise measuring apparatus 20 of the prescribed period for which that variation degree has been calculated being a non-object noise detection period in which a non-object noise has existed.

The noise measuring apparatus 20 is a noise meter which, on the basis of the sound pressure which has been detected by the nondirectional microphone 21, calculates instantaneous values of the piece of sound pressure information representing the loudness (such as the sound pressure (p), the sound pressure level (LP), and the noise level, which is the A-weighted sound pressure level), and has a function as an integration type noise meter for calculating an integration amount of equivalent noise level (LAeq), or the like. In addition, the noise measuring apparatus 20 is configured so as to calculate an integration amount of equivalent noise level (LAeq), or the like, excluding the non-object noise detection period which has been notified from the noise identifying apparatus 10.

Next, the determination operation in the noise identifying apparatus 10 of the present embodiment will be explained in detail with reference to FIG. 2 to FIG. 8.

Figure 2:
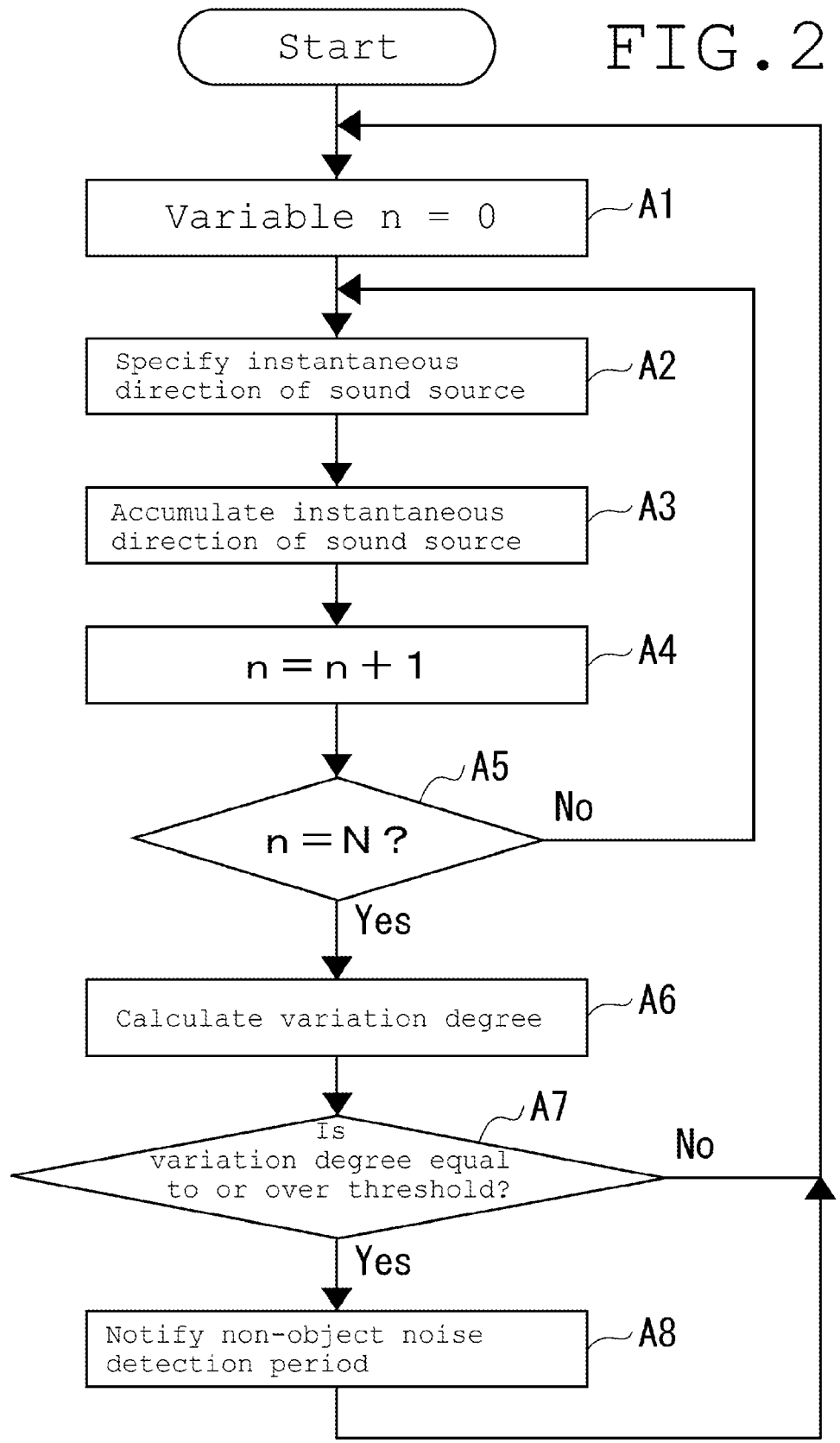
FIG. 2 is a flowchart for explaining the noise identification operation of the embodiment of the noise identifying apparatus in accordance with the present invention.

Referring to FIG. 2, the variation degree calculating unit 13 first sets the variable n at "0" (Step A1), waiting for data input from the sound source direction specifying unit 12. The sound source direction specifying unit 12 samples an output signal as an analog signal from the sound detection unit 11 at a prescribed period, and on the basis of the sampled data for a prescribed frequency band, specifies an instantaneous direction of a sound source and a piece of sound pressure information (Step A2) for outputting them to the variation degree calculating unit 13.

Next, the variation degree calculating unit 13 accumulates the instantaneous direction of the sound source and the piece of sound pressure information which have been data-inputted (Step A3), incrementing the variable n (Step A4), and determining whether or not the variable n reaches a prescribed number of sets N, which has been set (Step A5).

In Step A5, in the case where the variable n has not reached a prescribed number of sets N, which has been set, the variation degree calculating unit 13 returns to Step A2, again waiting for a data input from the sound source direction specifying unit 12. In the sound source direction specifying unit 12, an instantaneous direction of a sound source and a piece of sound pressure information are specified for each unit time, and thus, until a prescribed number of sets N of instantaneous direction of sound source and piece of sound pressure information are specified by the sound source direction specifying unit 12 and accumulated in the variation degree calculating unit 13, the steps from A2 to A5 are repeated.

In Step A5, in the case where the variable n has reached a prescribed number of sets N, which has been set, the variation degree calculating unit 13 calculates a variation degree of the sound source direction on the basis of the prescribed number of sets N of instantaneous direction of sound source and piece of sound pressure information (Step A6).

Here, the nature possessed by the variation degree which is calculated by the variation degree calculating unit 13 will be verified. The sound detection unit 11 of the noise identifying apparatus 10, an object source 30, which outputs an object noise (pink noise), and a non-object source 40, which outputs a non-object noise (pink noise), are disposed in an anechoic chamber, and at a 500 Hz band, specification of an instantaneous direction and a piece of sound pressure information for Step A2, and accumulation of the instantaneous direction and the piece of sound pressure information for Step A3 were performed. FIG. 3A shows a disposition of the object source 30 and the non-object source 40 with respect to the sound detection unit 11 in a horizontal direction, while FIG. 3B shows a disposition of the object source 30 and the non-object source 40 with respect to the sound detection unit 11 in a vertical direction. In a vertical direction, as shown in FIG. 3B, the object source 30 and the non-object source 40 are disposed in a location at an elevation angle of 90° in flush with the sound detection unit 11. In addition, in a horizontal direction, the object source 30 is fixed in a location of an azimuth of 90° at point A; the non-object source 40 is disposed at intervals of 30° from a location of point B at an azimuth of 120° to that of point G at an azimuth of 270'; and using the non-object source 40 disposed at the respective locations, the measurement was performed for 10 seconds with a unit time being set at 0.01 second to specify/accumulate 1000 instantaneous directions and pieces of sound pressure information.

Figure 4A:
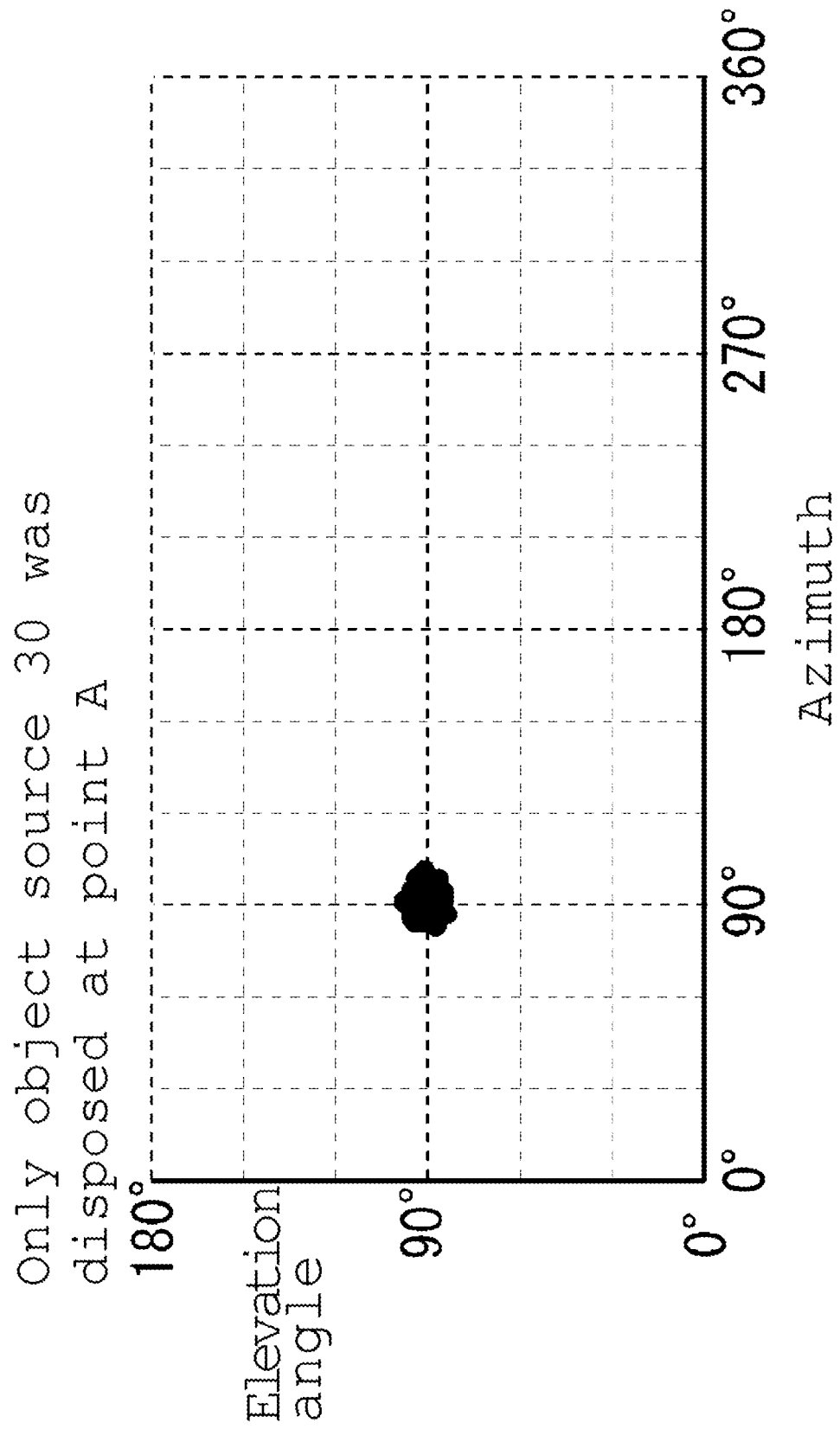
FIG. 4A to FIG. 4C are graphs each showing a variation in instantaneous direction in the verification experiment shown in FIG. 3A and FIG. 3B.
Figure 4B:
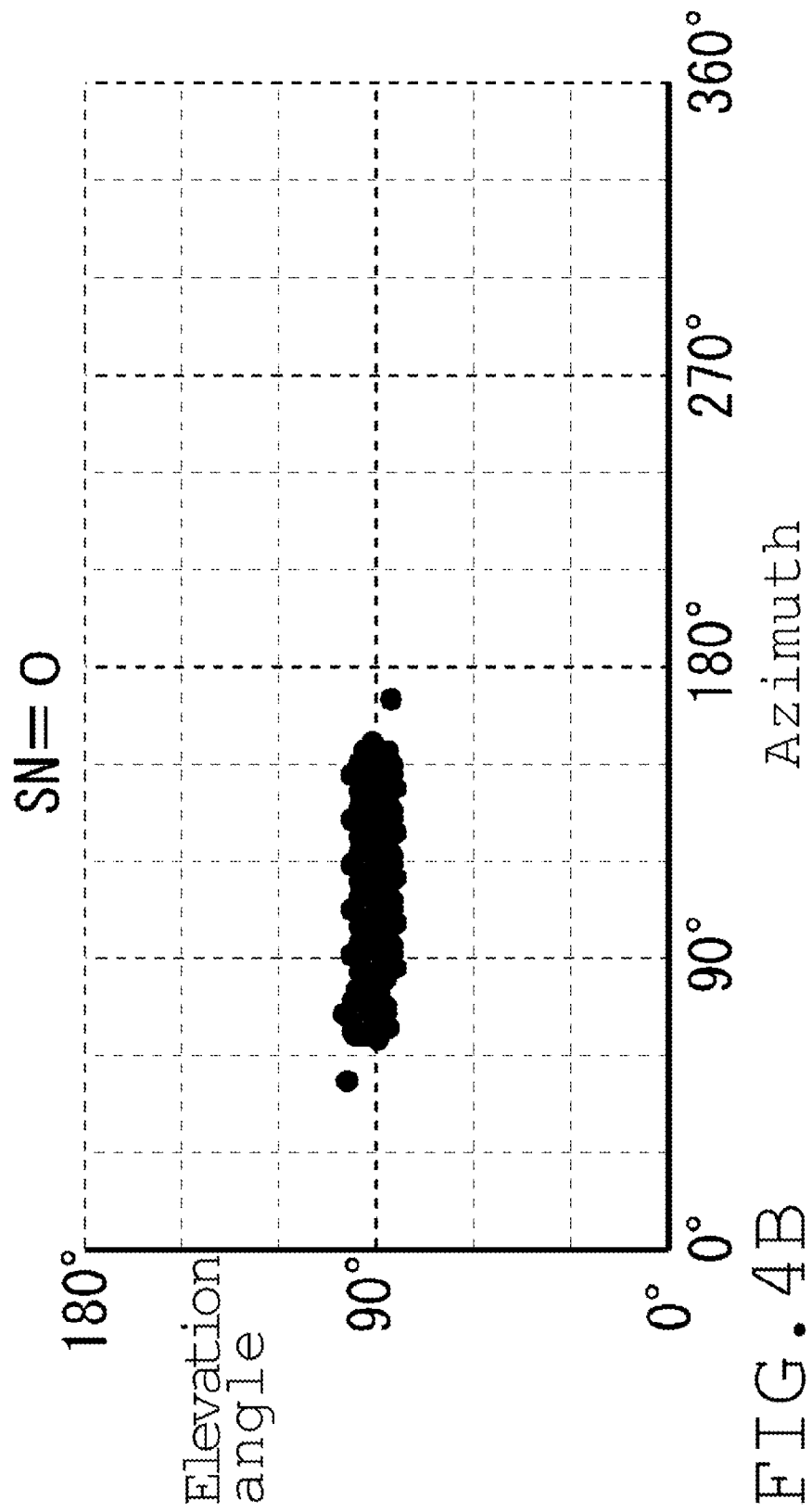
Figure 4C:
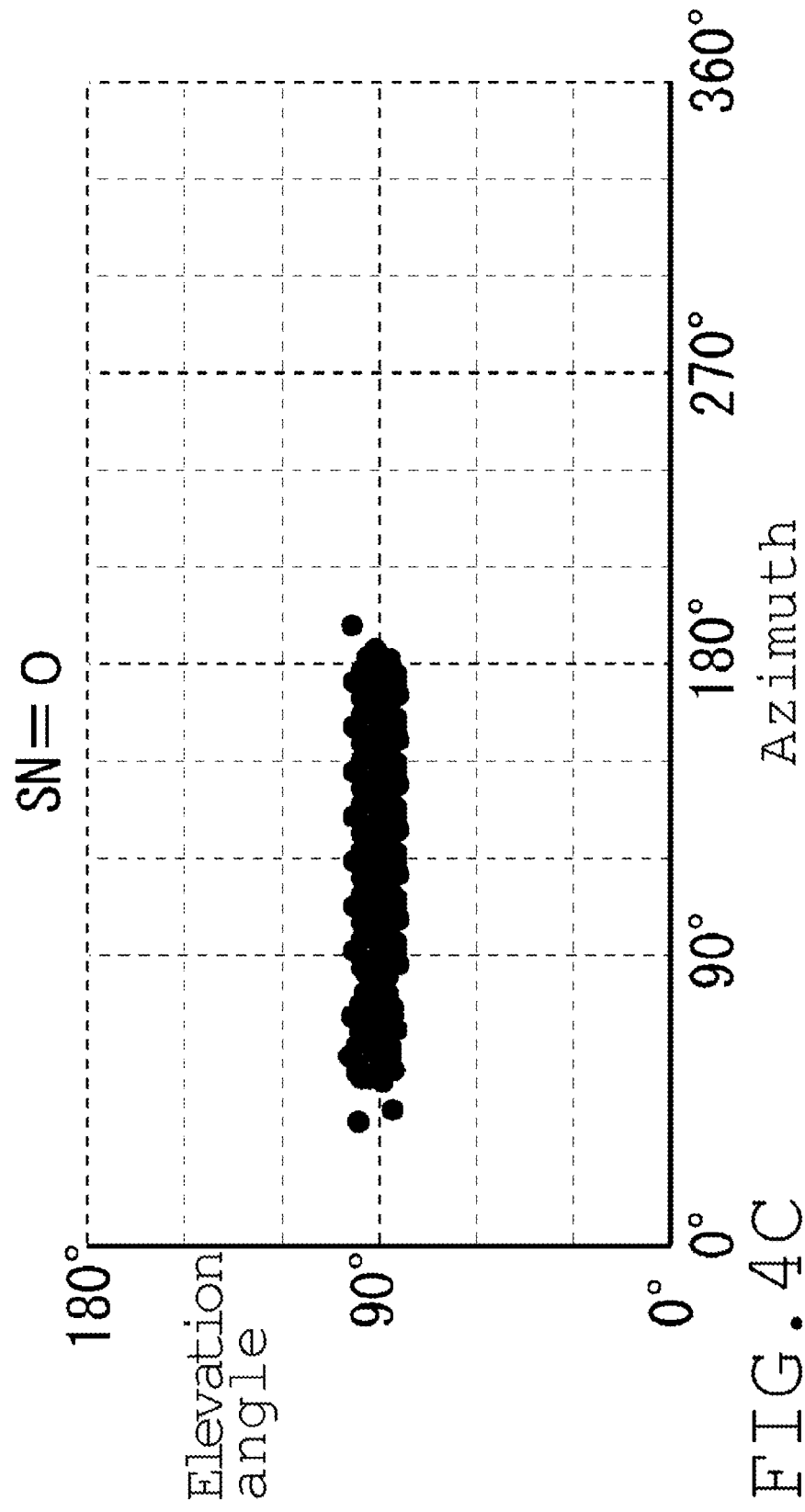

FIG. 4A gives an example of measurement in the case where, in a horizontal direction, only the object source 30 was disposed at point A of an azimuth of 90°. This example of measurement reveals that, in the case where only the object source 30 is disposed, an instantaneous direction for the object source 30 can be substantially exactly specified.

Figure 5B:
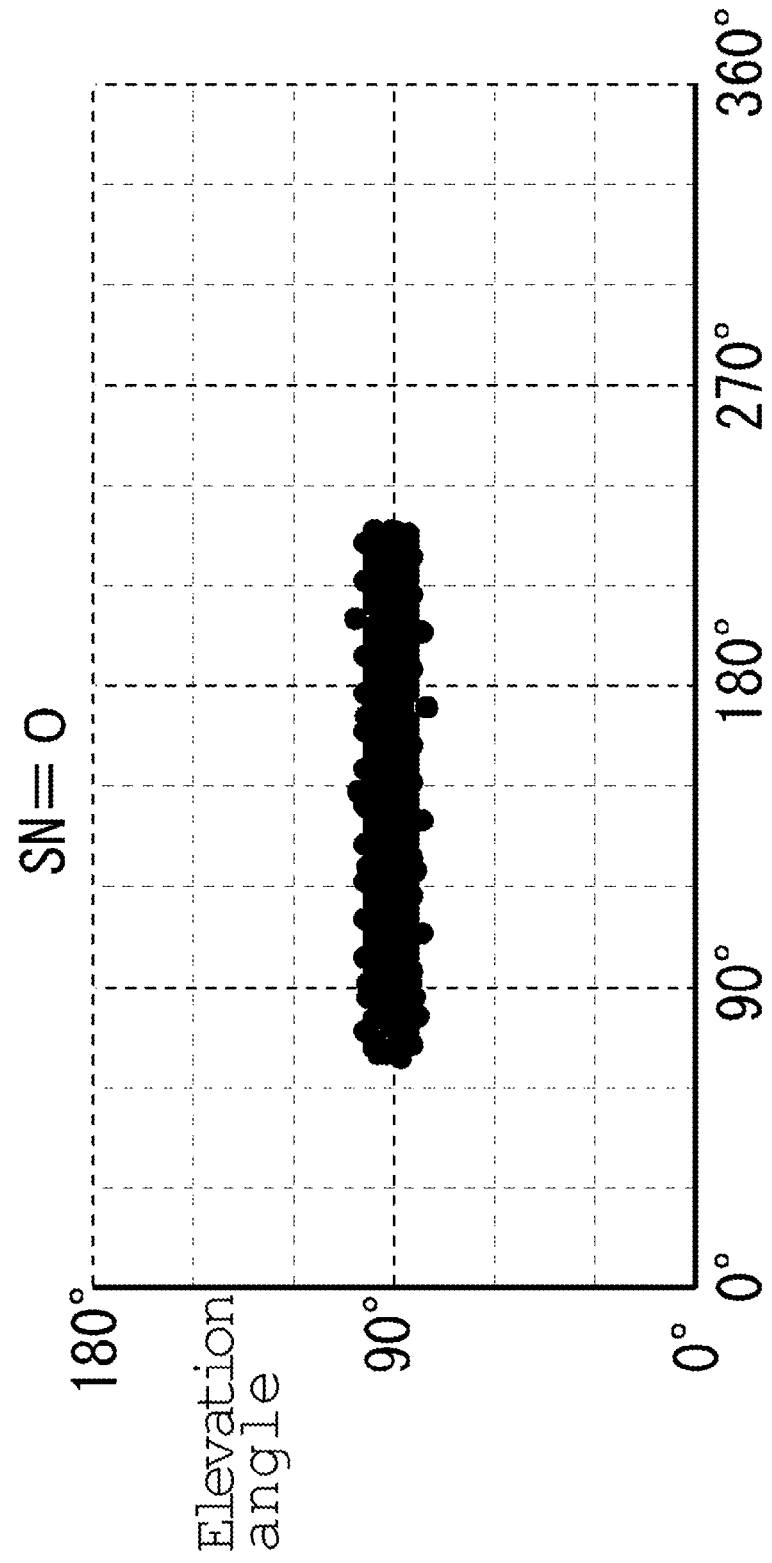
Figure 5D:
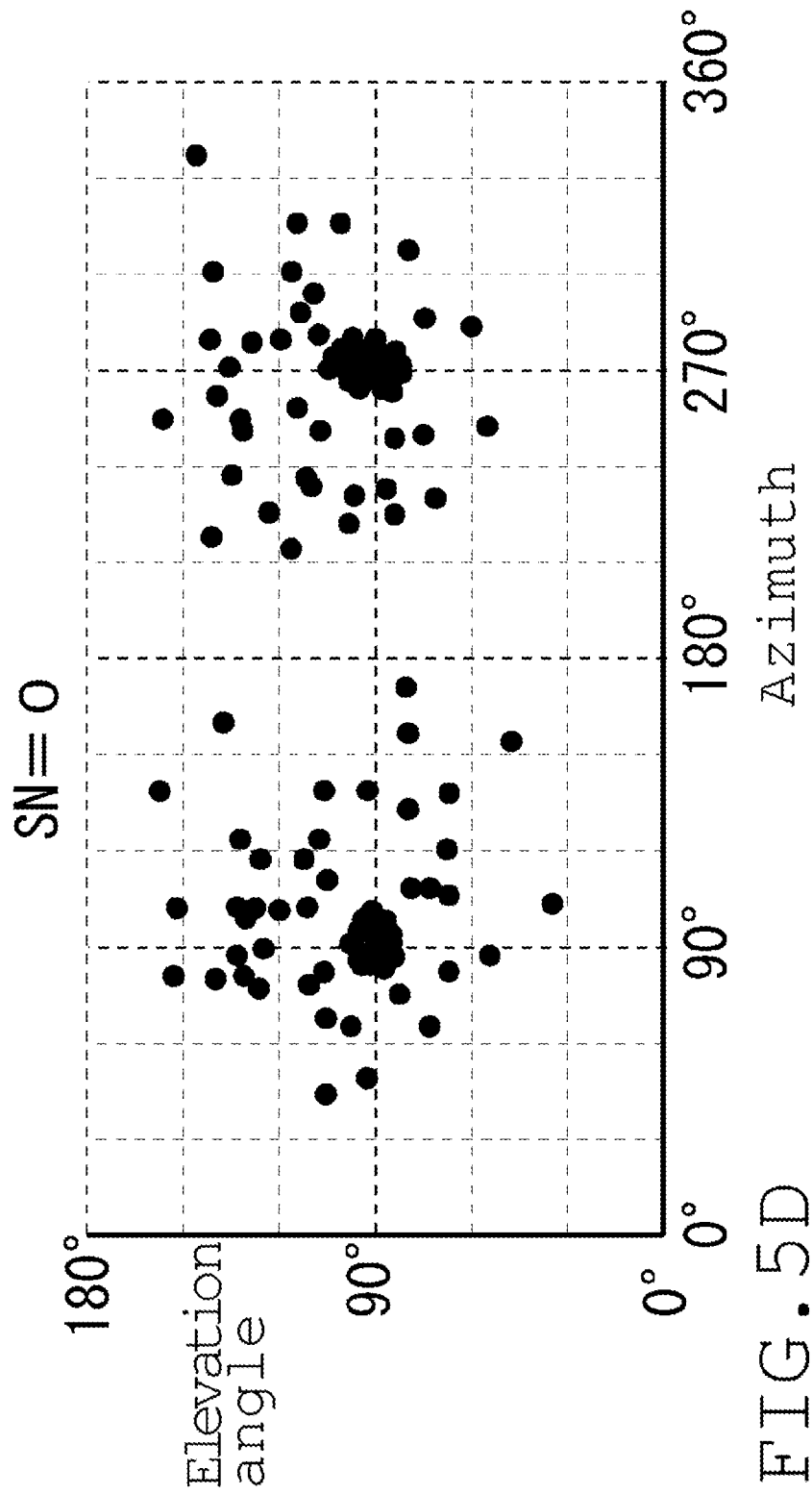

FIGS. 4B to 4C, and FIGS. 5A to 5D give examples of measurement in the case where, in a horizontal direction, the object source 30 was fixed in a location of an azimuth of 90° at point A; the non-object source 40 was disposed at intervals of 30° from a location of point B at an azimuth of 120° to that of point G at an azimuth of 270°; and the non-object source 40 disposed at the respective locations was used for performing the measurement. The measurement was performed with the output of the object source 30 and that of a non-object noise being set at the same level (the S/N ratio between the object noise and a non-object noise being set at 0). These examples of measurement in which there exist a plurality of noise sources reveal that the instantaneous direction is not limited to the direction of the object source 30 or the non-object source 40, and takes various directions between the direction of the object source 30 and that of the non-object source 40. In FIG. 5D, the percentage at which the direction of the object source 30 or the non-object source 40 was specified as an instantaneous direction is high, however, the variation in the instantaneous direction which was specified is great.

Figure 6A:
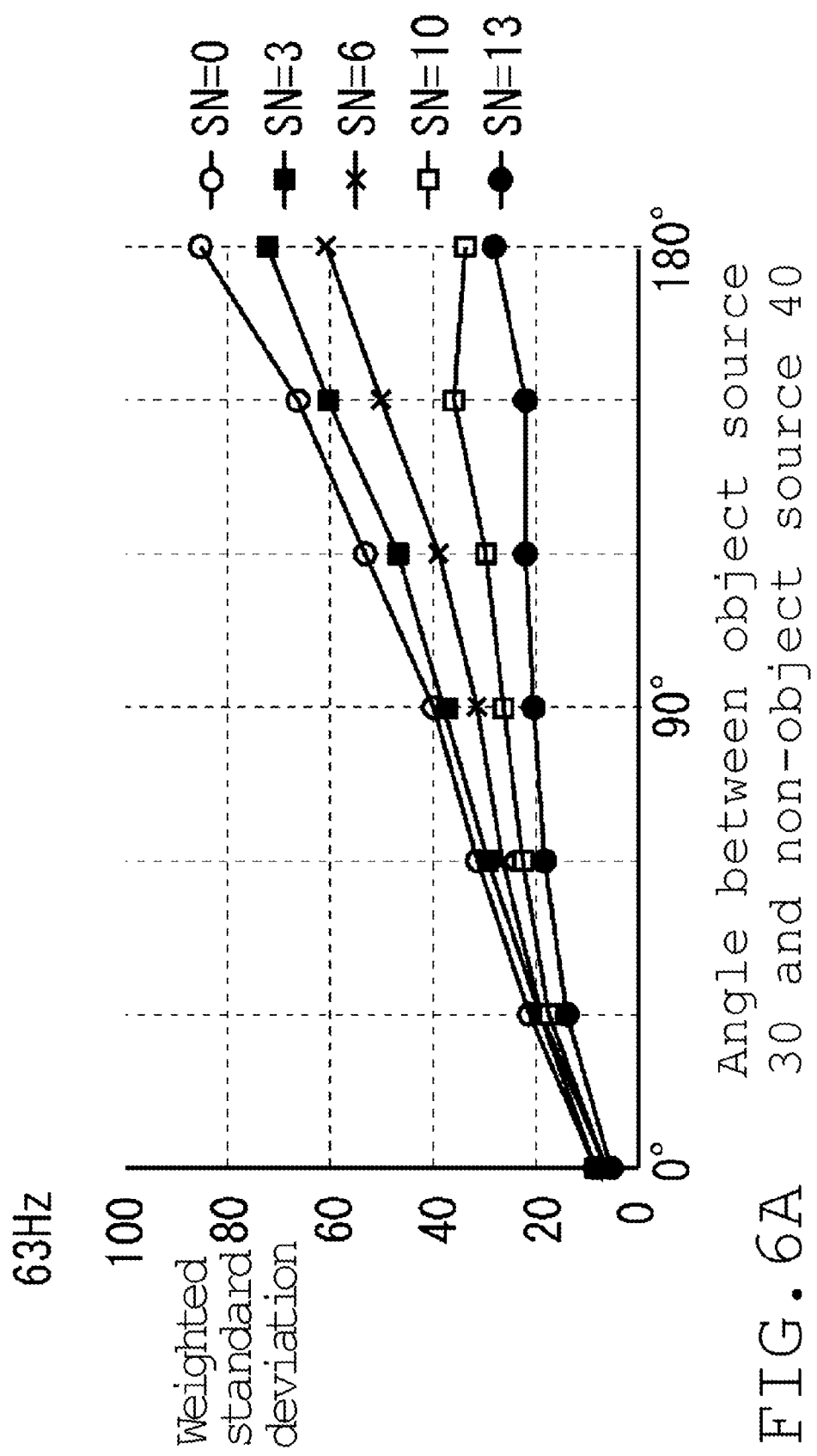
Figure 6B:
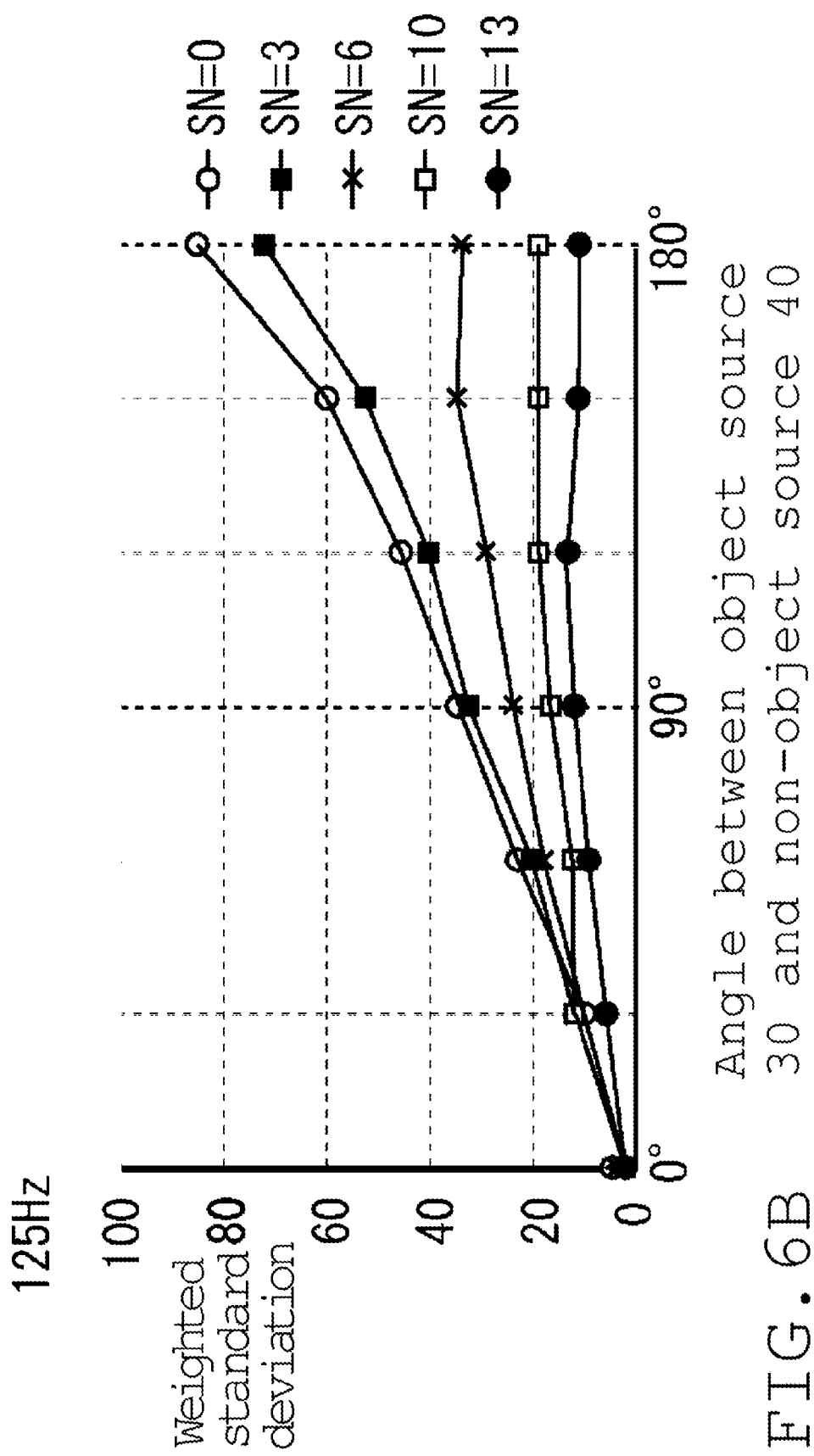
Figure 6C:
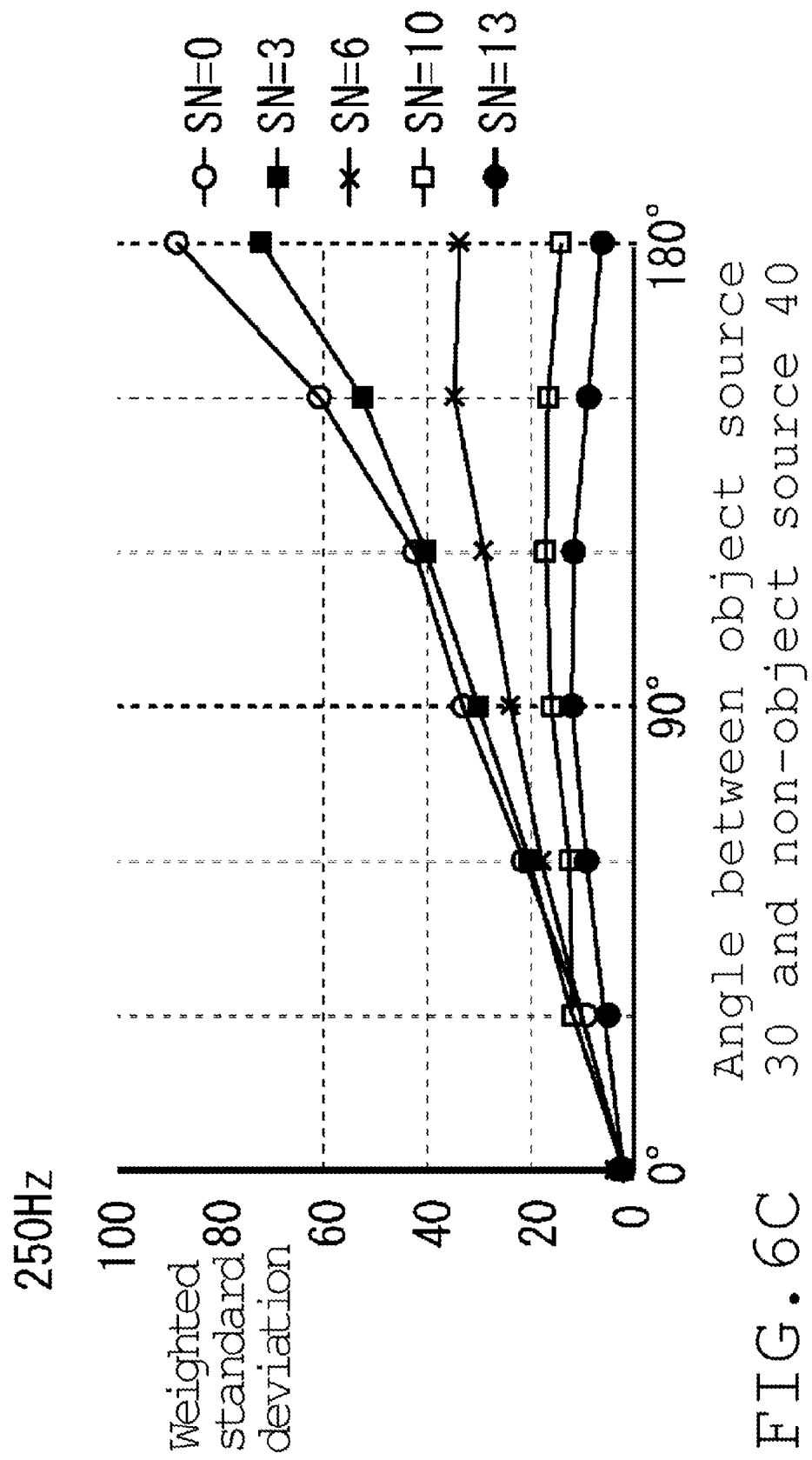
Figure 7A:
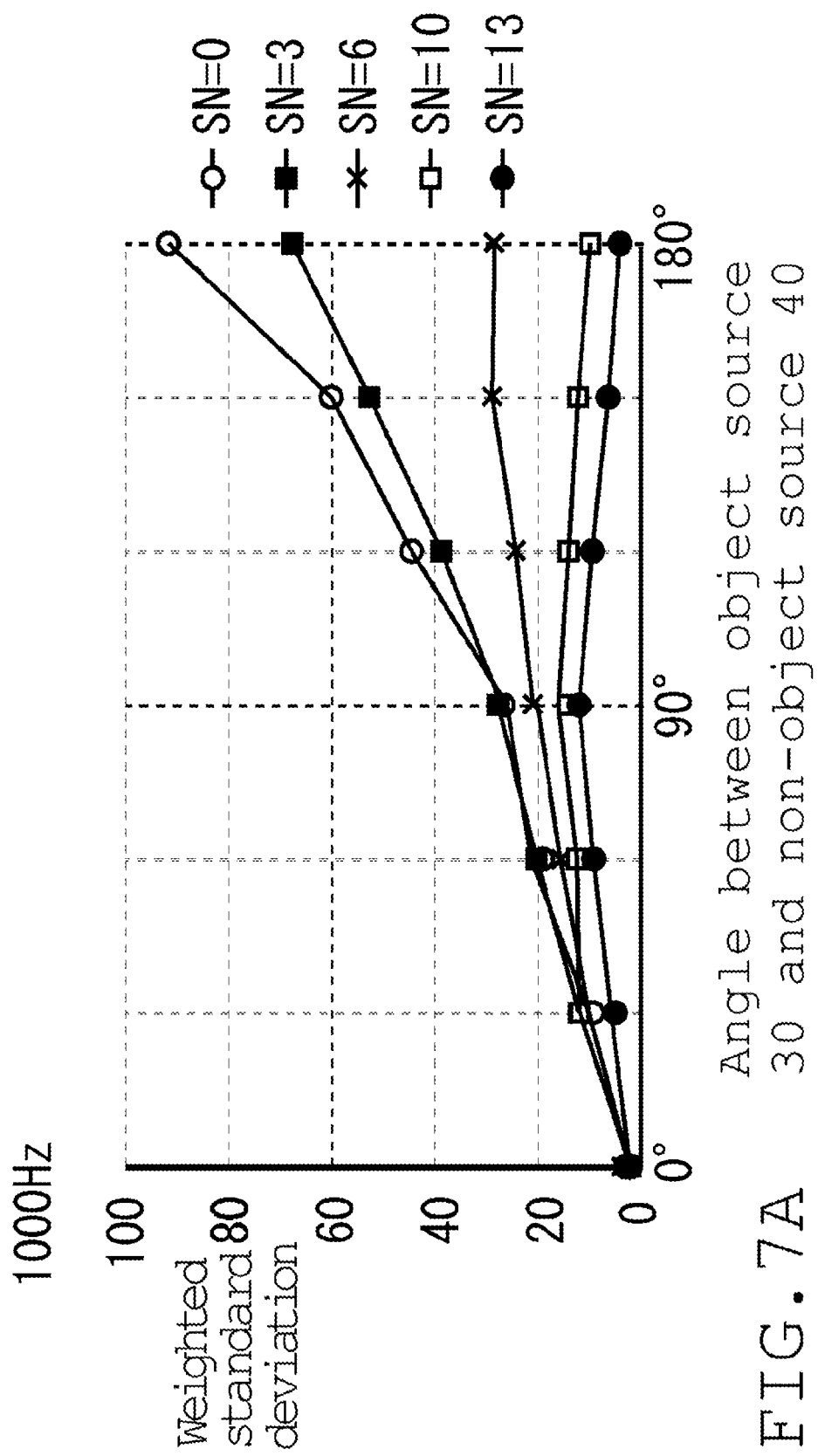
FIG. 7A to FIG. 7D are graphs each showing a relationship between the variation degree (weighted standard deviation) calculated in the verification experiment shown in FIG. 3A and FIG. 3B and a particular S/N ratio.
Figure 7B:
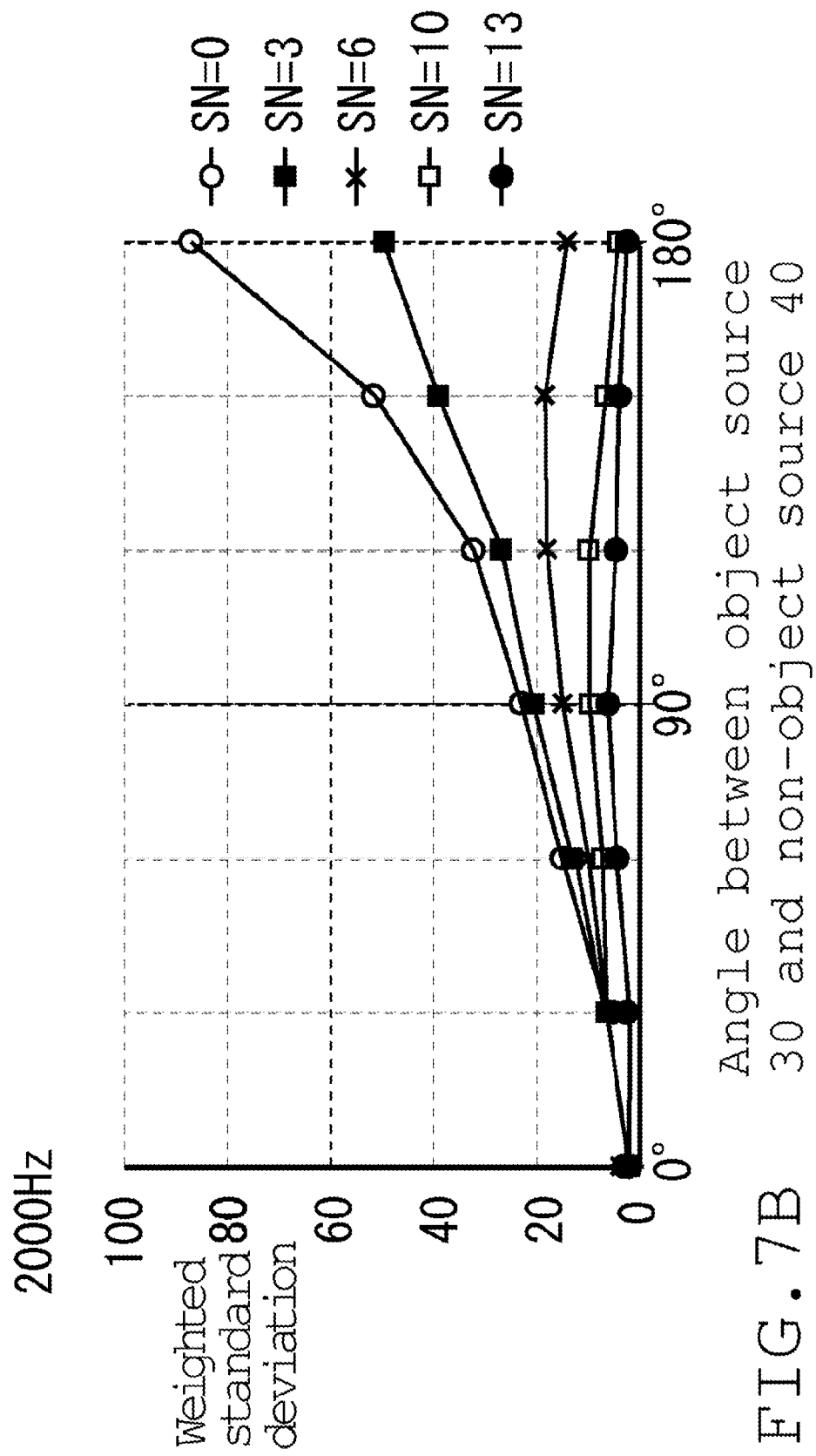
Figure 7C:
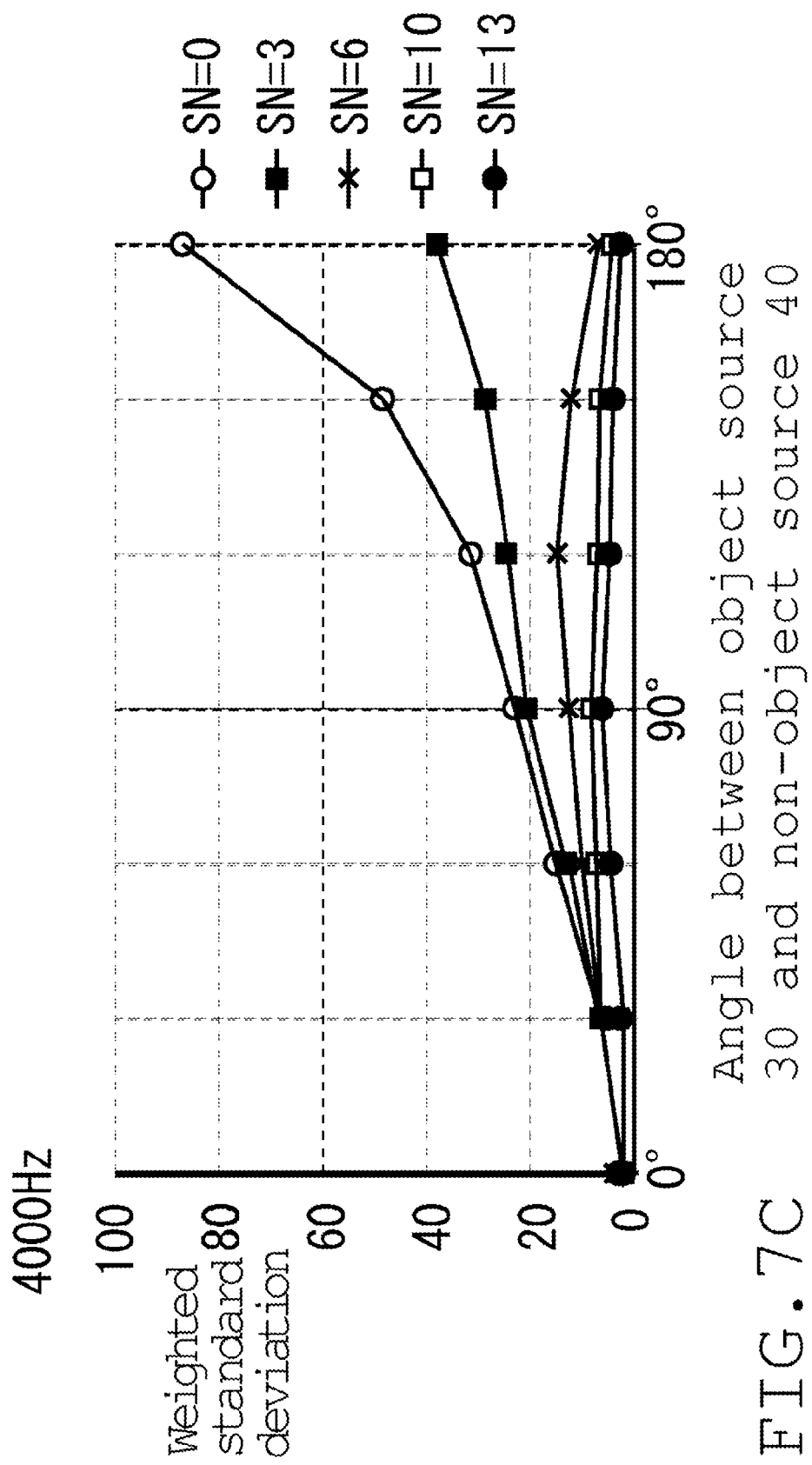
Figure 7D:
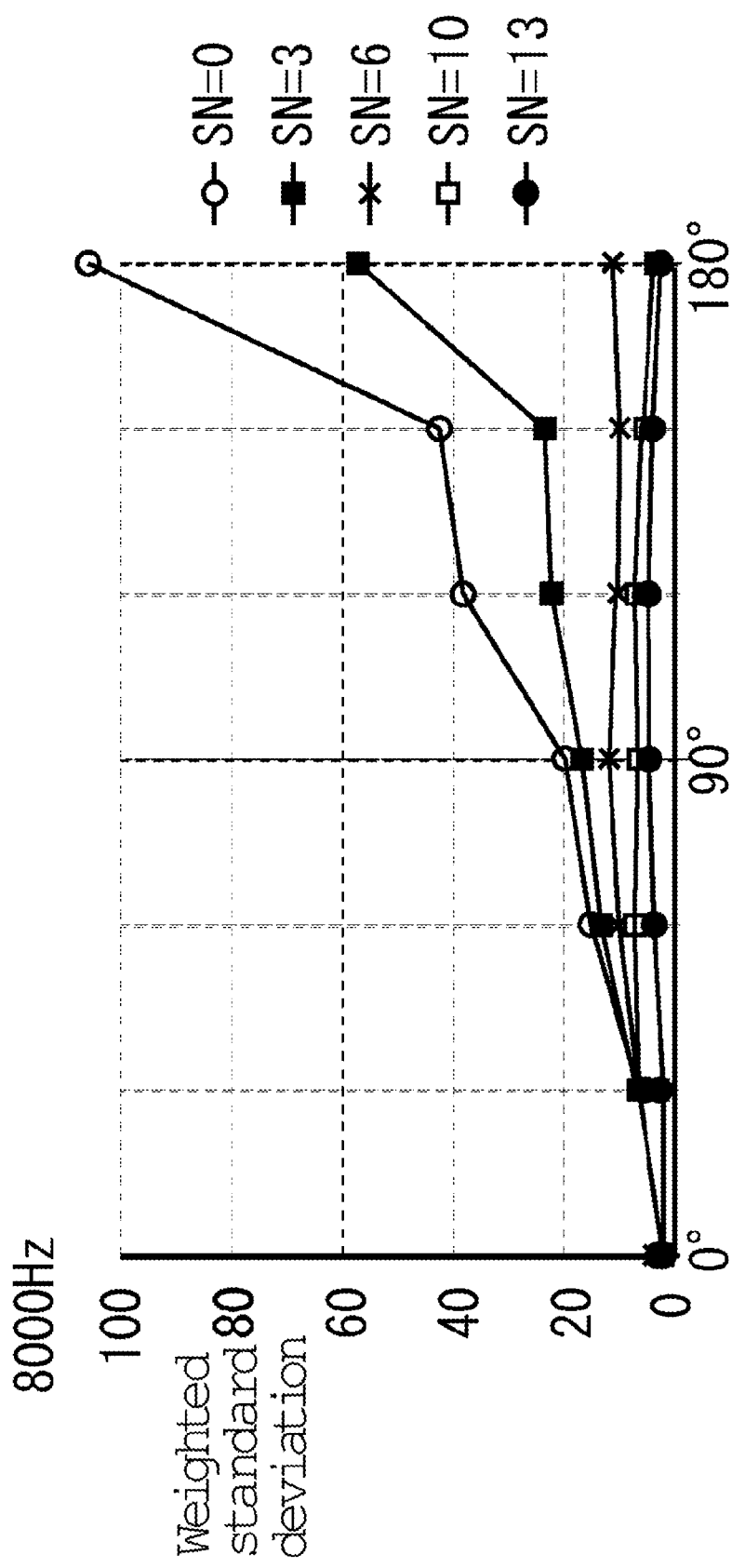
Figure 8:
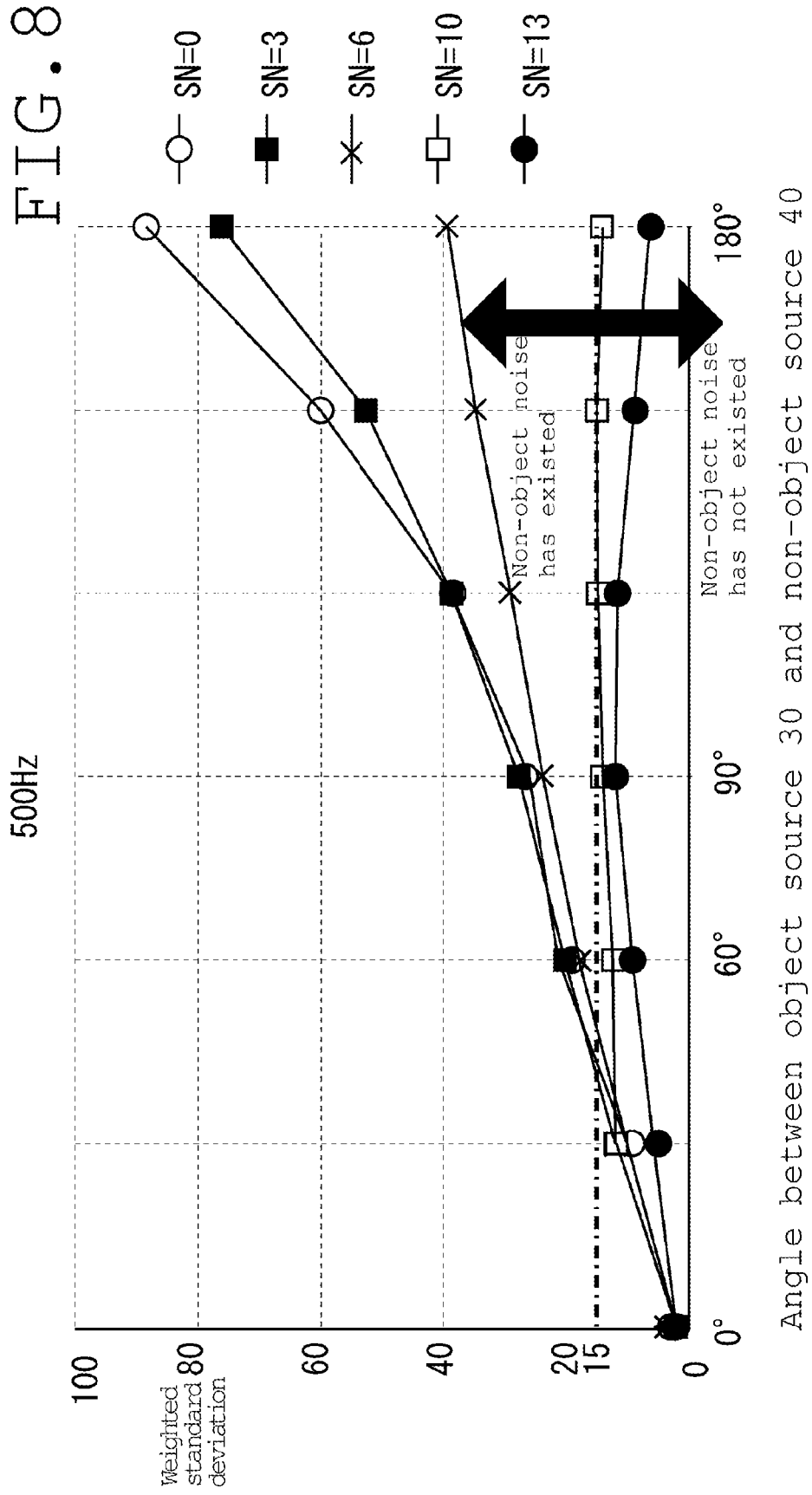
FIG. 8 is a graph showing an example of threshold which is used by the non-object noise determining unit shown in FIG. 1 for comparison with a variation degree.
Figure 9A:
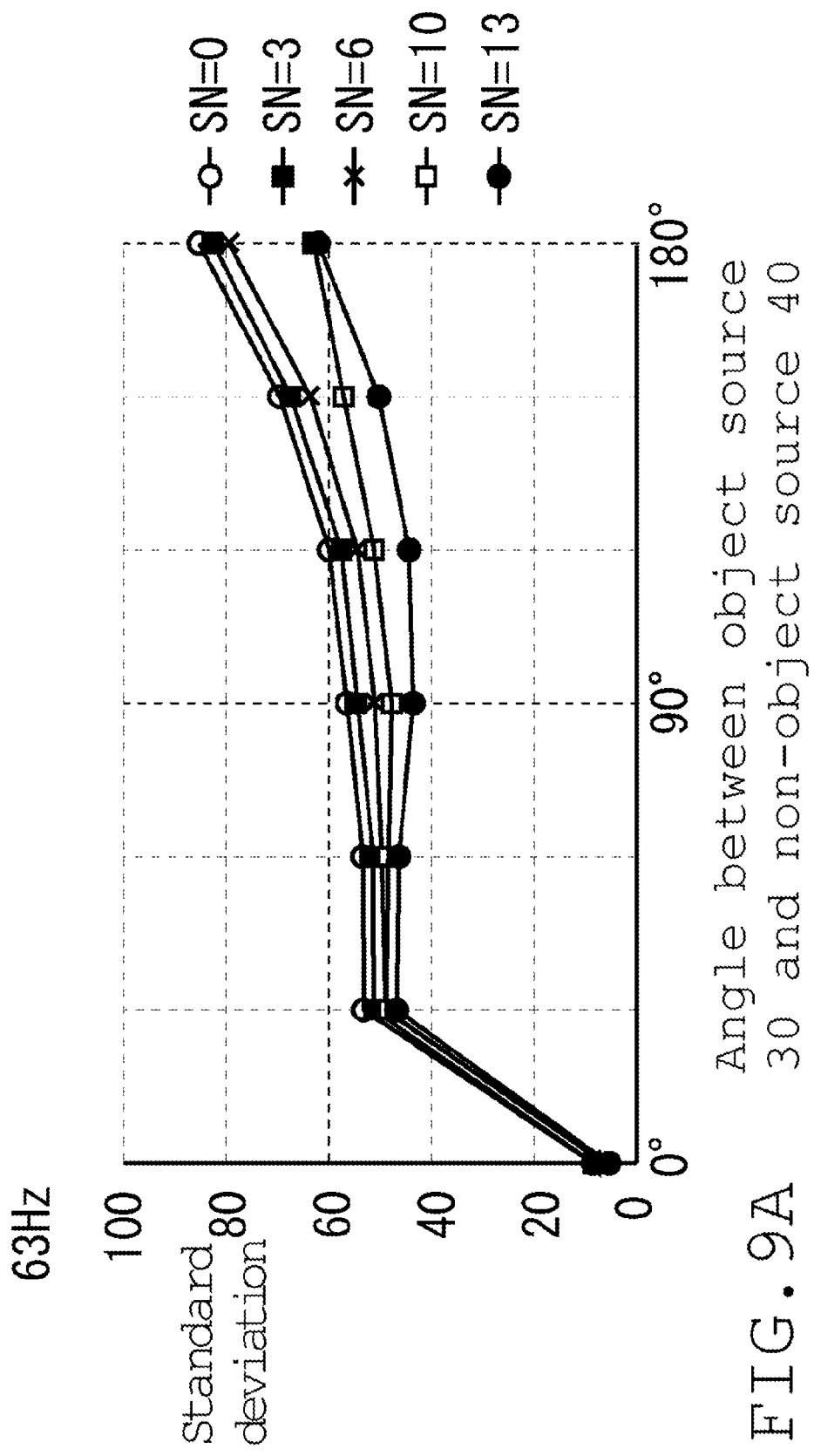
FIG. 9A to FIG. 9D are graphs each showing a relationship between the variation degree (weighted standard deviation) calculated in the verification experiment shown in FIG. 3A and FIG. 3B and a particular S/N ratio.
Figure 9B:
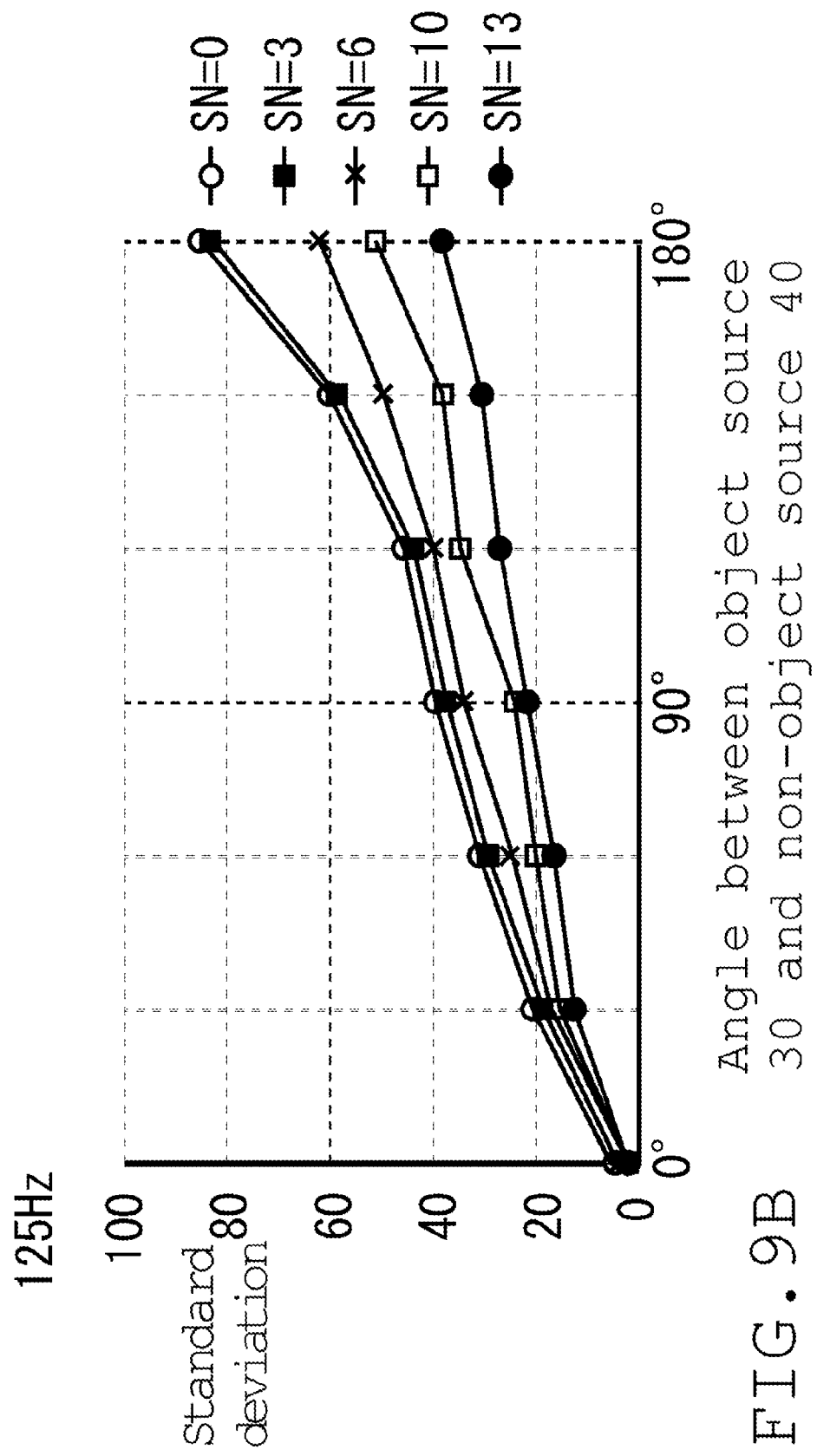
Figure 9C:
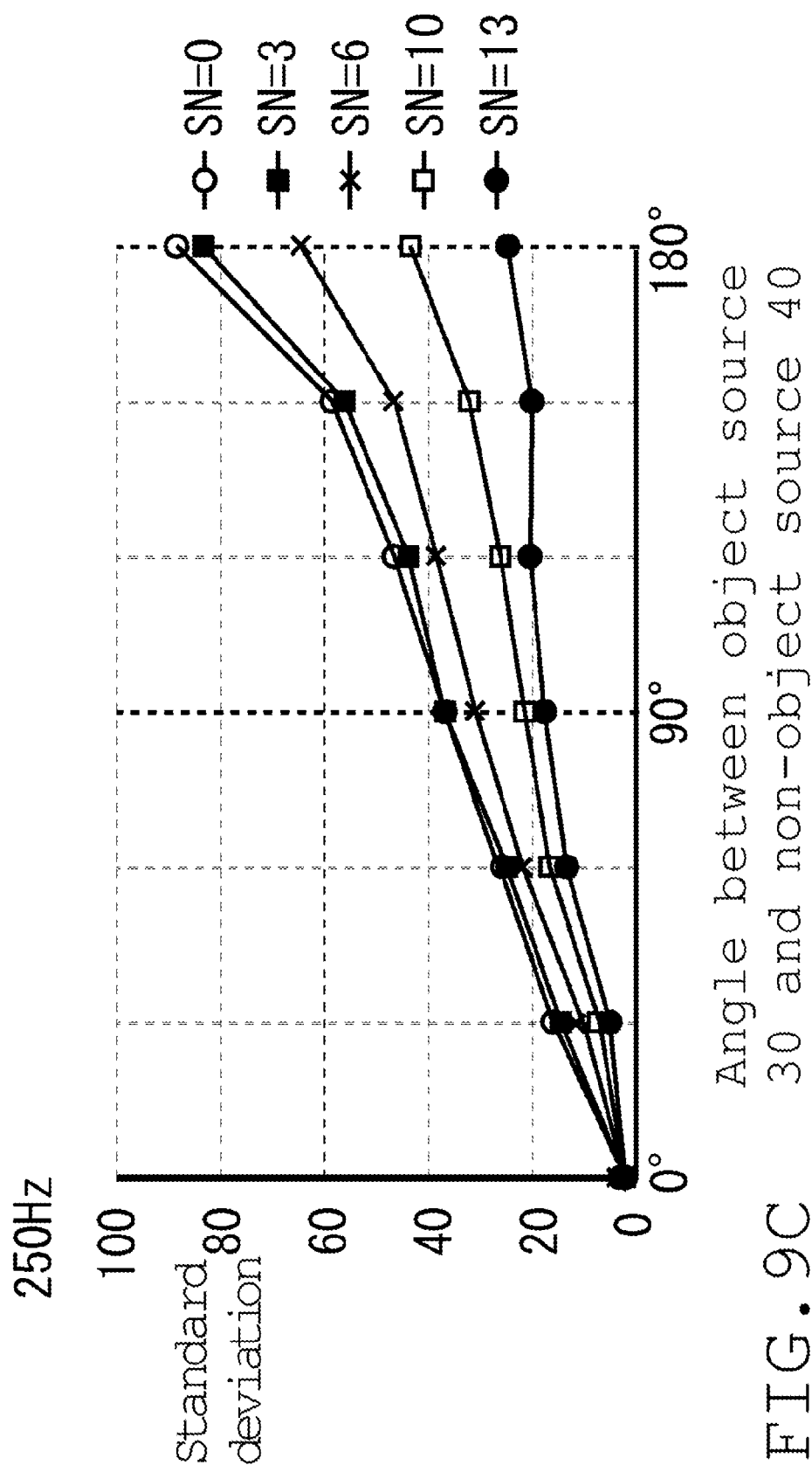
Figure 9D:
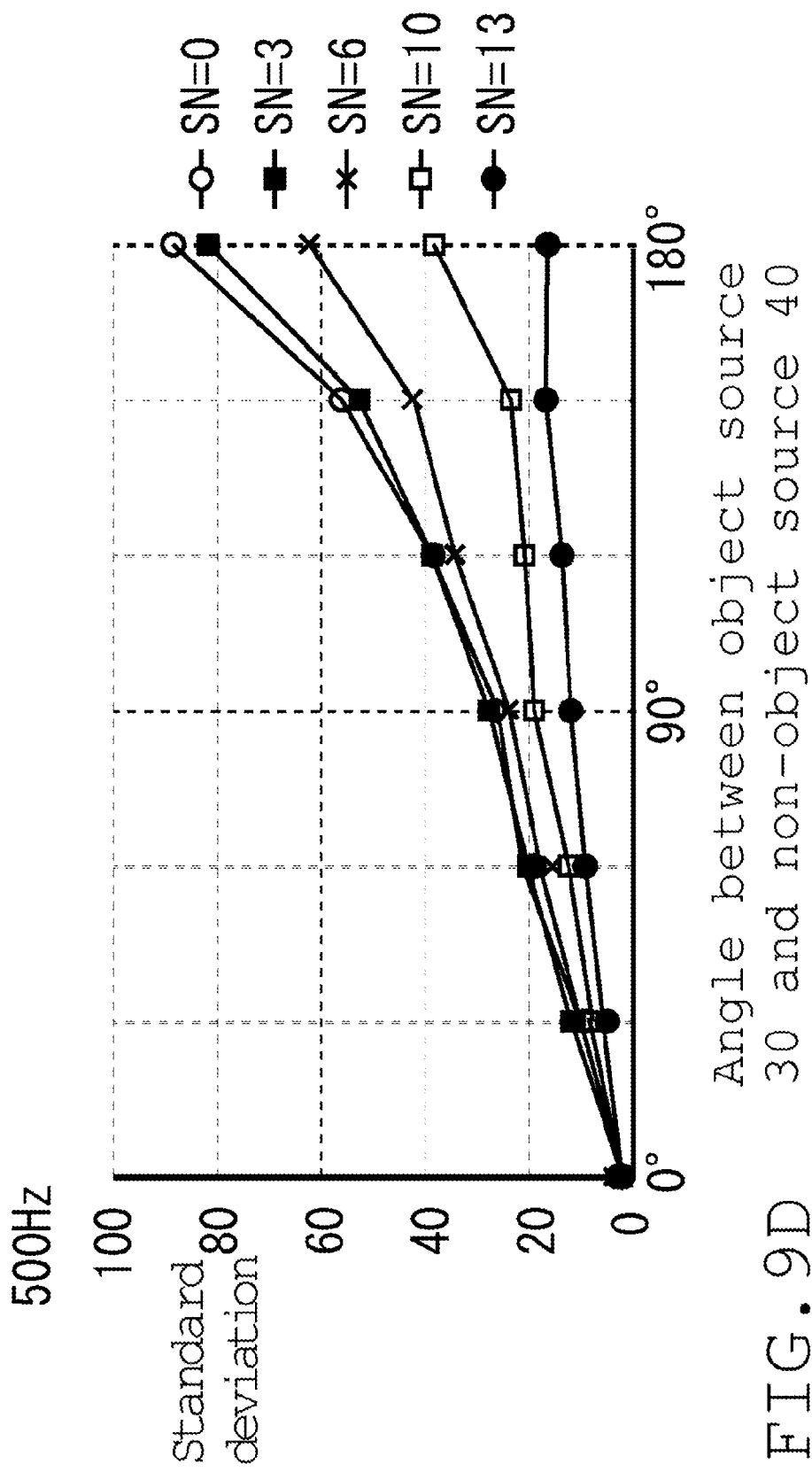

Next, for the respective dispositions shown in FIG. 3, the output ratio (S/N ratio) between the object source 30 and the non-object source 40, and the frequency band were varied; and for the respective S/N ratios and the respective frequency bands, an instantaneous direction and a piece of sound pressure information were specified/accumulated, and in Step A6, a weighted standard deviation of the instantaneous direction that includes the piece of sound pressure information was calculated as a variation degree. The results thereof are shown in FIG. 6 and FIG. 7. From these examples of calculation, it can be seen that, if the S/N ratio is small, the larger the angle formed between the object source 30 and the non-object source 40 (the greater the difference in azimuth), the larger the value of weighted standard deviation will be, and if the S/N ratio is large, the increase in weighted standard deviation tends to hit the limit, even when the angle formed between the object source 30 and the non-object source 40 (the difference in azimuth) is increased. In addition, it can be seen that the higher the frequency band, the smaller the S/N ratio with which the weighted standard deviation hits the limit will be. Therefore, by selecting an appropriate frequency band, and comparing the calculated weighted standard deviation with an appropriate threshold, it can be determined whether or not there has existed a non-object noise which has influenced the object noise, providing an S/N ratio of under 10. For example, at a frequency band of 500 Hz shown in FIG. 6D, by setting the threshold at 15 as shown in FIG. 8, the calculated weighted standard deviation is compared with the threshold. In this case, it can be seen that, if the calculated weighted standard deviation is equal to or over the threshold, there has always existed a non-object noise which has influenced the object noise, providing an S/N ratio under 10, regardless of the angle of the non-object source 40 with respect to the object source 30. On the other hand, if the calculated weighted standard deviation is under the threshold, there is the possibility that, only in the case where the non-object source 40 exists at an angle within 45° with respect to the object source 30, there has existed a non-object noise which has influenced the object noise, providing an S/N ratio under 10. In other words, it can be seen that, in the case where the non-object source 40 is not given at an angle within 45° with respect to the object source 30, if the calculated weighted standard deviation is under the threshold, there has existed no non-object noise which has influenced the object noise, providing an S/N ratio under 10. Therefore, in measuring an actual object noise, by selecting a measurement location where the incoming direction of an expected non-object noise is different from the incoming direction of the object noise by over 45°, the existence of the non-object noise can be reliably identified. Needless to say, even if the incoming direction of an expected non-object noise is different from the incoming direction of the object noise by 45° or less, the existence of the non-object noise can be identified at a certain probability.

Figure 10A:
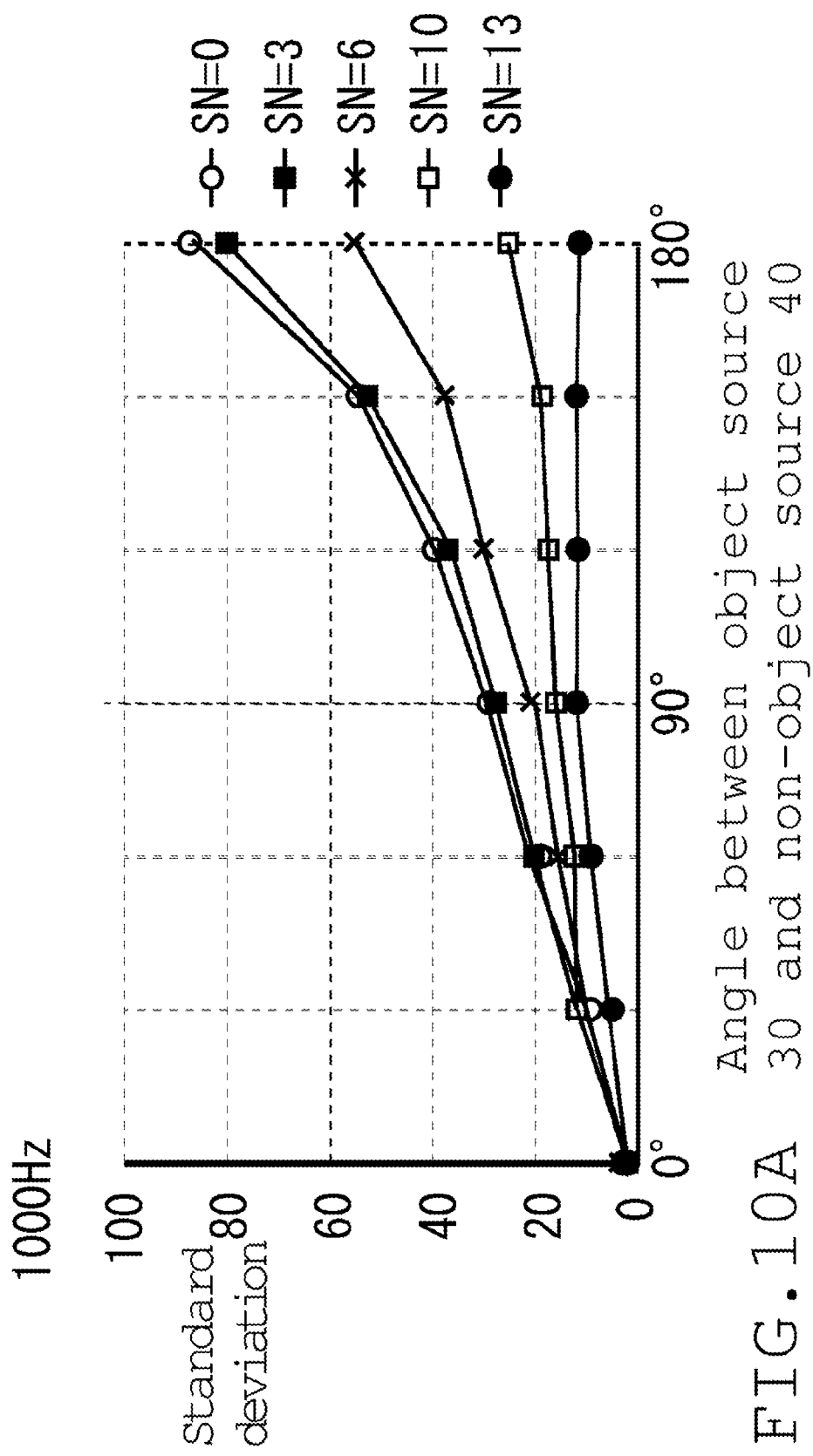
Figure 10B:
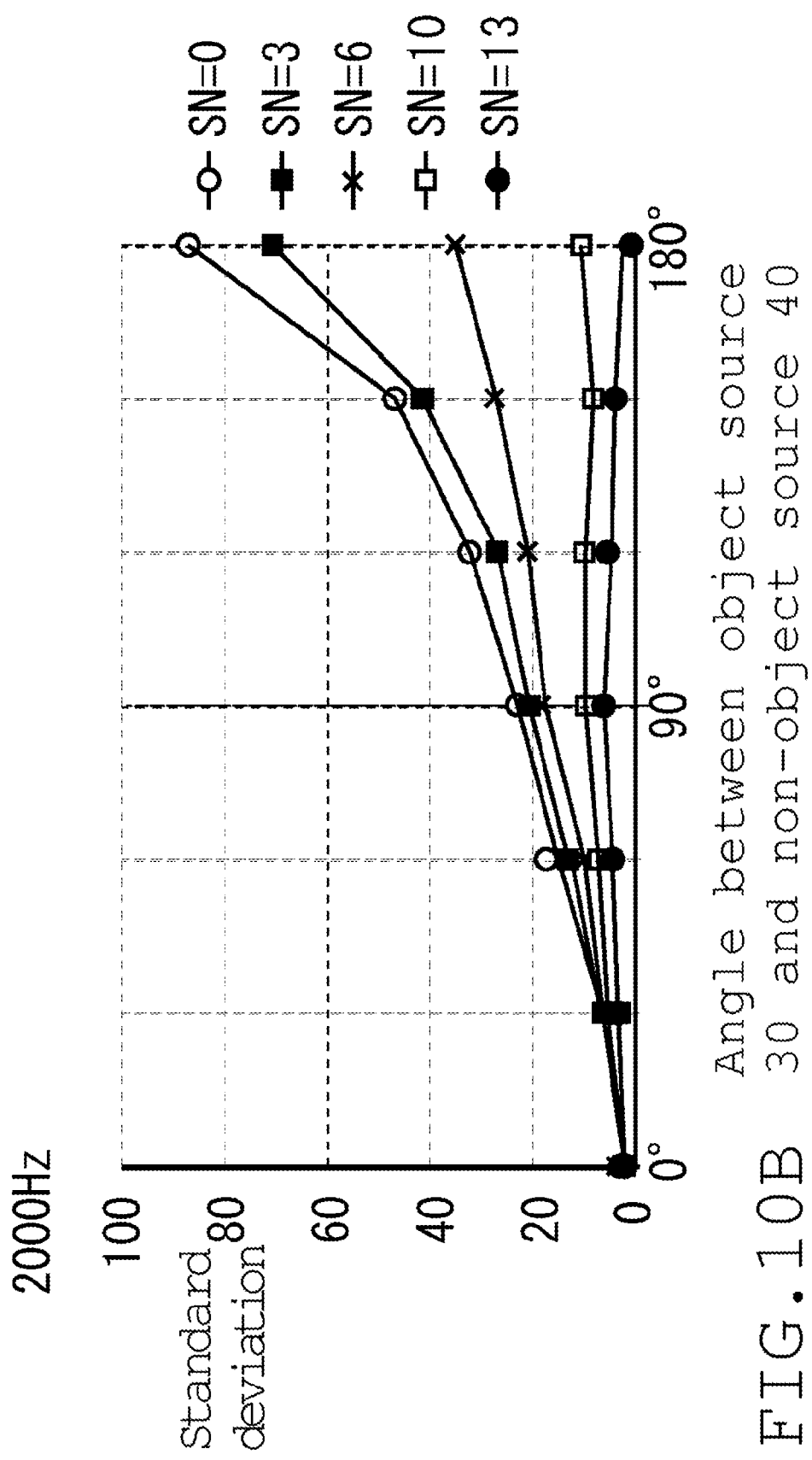
Figure 10C:
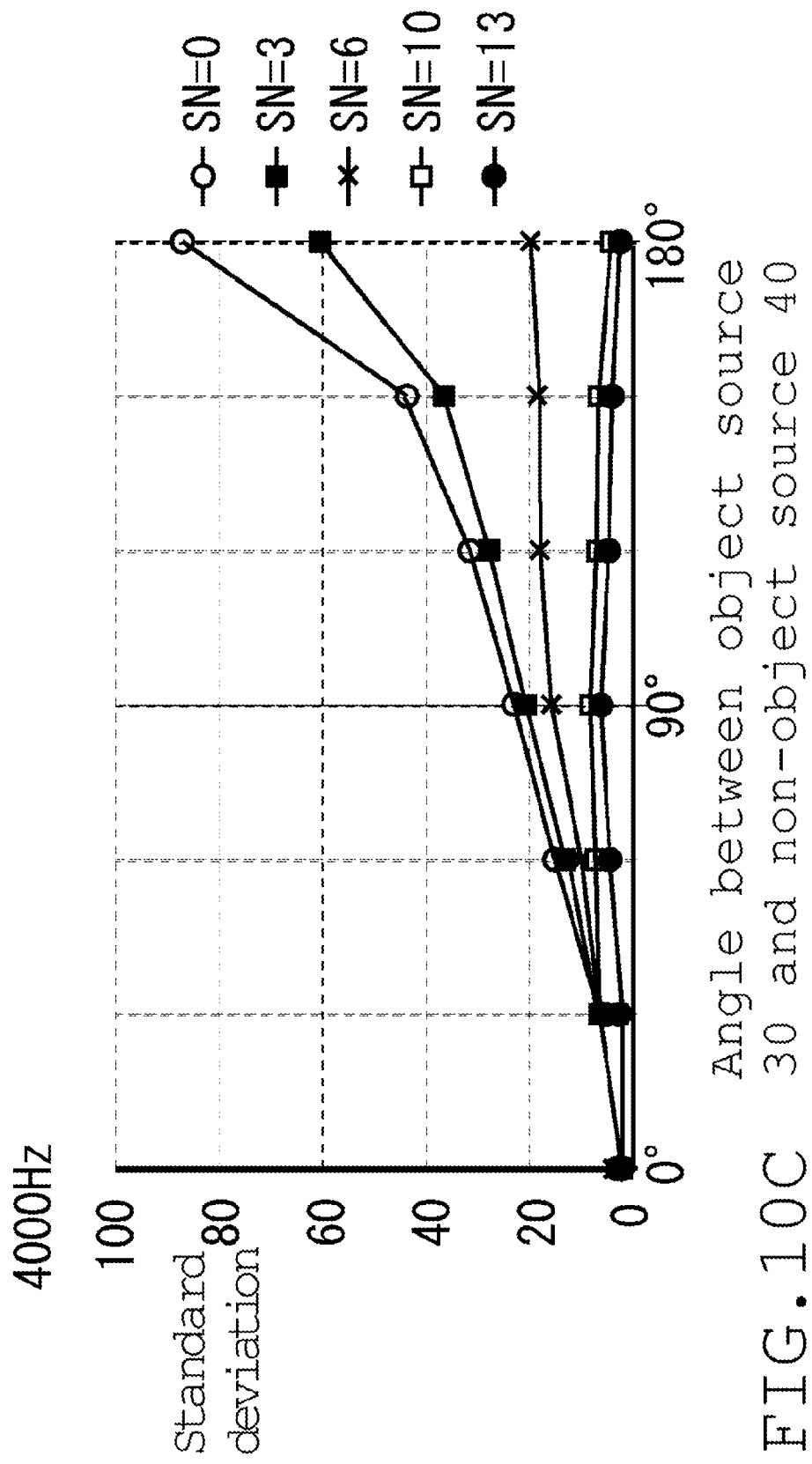

In FIG. 9 and FIG. 10, there are given examples of calculation of a standard deviation of the instantaneous direction as a variation degree that was performed without including the piece of sound pressure information in Step A6. From these examples of calculation, it can be seen that, if the frequency band is 2000 Hz or over, there is exhibited the same tendency of the weighted standard deviation of the instantaneous direction that includes the piece of sound pressure information. In other words, it can be seen that, if the S/N ratio is small, the larger the angle formed between the object source 30 and the non-object source 40 (the greater the difference in azimuth), the larger the value of standard deviation will be, and if the S/N ratio is large, the increase in standard deviation tends to hit the limit even when the angle formed between the object source 30 and the non-object source 40 (the difference in azimuth) is increased. Therefore, even with the standard deviation which is calculated without including the piece of sound pressure information, by selecting an appropriate frequency band of 2000 Hz or over, and comparing the calculated standard deviation with an appropriate threshold, it can be determined whether or not there has existed a non-object noise which has influenced the object noise, providing an S/N ratio of under 10.

Returning to FIG. 2, the non-object noise determining unit 14 determines whether or not the variation degree which has been calculated in Step A6 is equal to or over the threshold which has been set (Step A7). In Step A7, in the case where the variation degree is under the threshold which has been previously set, the non-object noise determining unit 14 determines that there has existed no non-object noise in the prescribed period for which that variation degree has been calculated, returning to Step A1 for performing the determination operation for the next prescribed period. It is preferable that the threshold which is compared with the variation degree in Step A7 be configured to be alterable. For example, in an actual measurement, there exists a ground reflection, and therefore, the variation degree which is calculated in Step A6 may be expected to be raised, or the variation degree may be changed, depending upon the dynamic characteristic (time constant) involved in specifying an instantaneous direction of the sound source and a piece of sound pressure information in Step A2, or the number of data or the time used in calculating a variation degree in Step A6. Therefore, the threshold can preferably be changed in accordance with the situation, such as the degree of ground reflection, or the like.

In Step A7, in the case where the variation degree is equal to or over the threshold which has been previously set, the non-object noise determining unit 14 determines that there has existed a non-object noise in the prescribed period for which that variation degree has been calculated, and notifies the noise measuring apparatus 20 of the prescribed period for which that variation degree has been calculated as a non-object noise detection period in which a non-object noise has existed (Step A8), returning to Step A1 for performing the determination operation for the next prescribed period.

Thus, the noise measuring apparatus 20 can recognize a non-object noise detection period in which there has existed a non-object noise that has influenced the measurement of the object noise, and, for example, the noise measuring apparatus 20 can calculate an integration amount of equivalent noise level (LAeq), or the like, excluding the non-object noise detection period which has been notified.

As explained above, the noise identifying apparatus according to the present embodiment includes the sound detection unit 11, which has a plurality of microphones and/or particle velocity sensors; the sound source direction specifying unit 12, which, on the basis of the result of detection by the sound detection unit 11, specifies an instantaneous direction of a sound source for each unit time; the variation degree calculating unit 13, which, for a prescribed period set longer than the unit time, calculates a variation degree of the plurality of instantaneous directions which have been specified by the sound source direction specifying unit 12; and the non-object noise determining unit 14, which, on the basis of the variation degree which has been calculated by the variation degree calculating unit 13, determines the existence/absence of a non-object noise which has influenced the measurement of an object noise coming from a noise source taken as an object to be measured. This configuration allows the existence/absence of a non-object noise which has influenced the measurement of the object noise to be determined with no need for a sound source identifying person making a sound source identification by trial listening, or an on-site sound source identification between a sound source of an object noise and a sound source of a non-object noise, and thus whether or not the measured noise has been influenced by a non-object noise can be automatically identified with a simple system.

Further, according to the present embodiment, the non-object noise determining unit 14 is configured such that it, upon having determined that there has existed a non-object noise which has influenced the measurement of the object noise, outputs the prescribed period for which the variation degree has been calculated by the variation degree calculating unit 13, as a non-object noise detection period. This configuration allows the noise measuring apparatus 20 to recognize a non-object noise detection period in which there has existed a non-object noise that has influenced the measurement of the object noise, and for example, allows the noise measuring apparatus 20 to calculate an integration amount of equivalent noise level (LAeq), or the like, excluding the non-object noise detection period which has been notified.

Further, according to the present embodiment, the sound source direction specifying unit 12 is configured so as to specify a piece of sound pressure information together with the instantaneous direction, while the variation degree calculating unit 13 being configured so as to calculate a weighted standard deviation including the piece of sound pressure information as a variation degree. In addition, the variation degree calculating unit 13 may be adapted to generate a distribution map of the instantaneous direction of the sound source, and calculate, as a variation degree, a correlation coefficient between the map and a reference distribution map which has been previously set. This configuration allows the variation degree to be determined by a simple calculation.

It is obvious that the present invention is not limited to the above embodiment, and the above embodiment can be altered as appropriate within the scope of the technical concept of the present invention. In addition, the number, location, geometry, and the like, of the respective component members are not limited to those indicated in the above-mentioned embodiment, and may be altered to an appropriate number, location, geometry, and the like, which are suitable for embodying the present invention. In the respective drawings, the same components are provided with the same symbols.

INDUSTRIAL APPLICABILITY

The noise identifying apparatus 10 in accordance with the present invention is applicable to automatic acquisition of a piece of sound pressure information by means of the noise measuring apparatus 20, being used with any items, such as electronic equipment, home appliances, and various vehicles, or in any locations, such as plants and facilities, which give off a certain sound or sounds.

DESCRIPTION OF SYMBOLS

The symbol 10 denotes a noise identifying apparatus; 11 a sound detection unit; 12 a sound source direction specifying unit; 13 a variation degree calculating unit; 14 a non-object noise determining unit; 20 a noise measuring apparatus; 30 an object source; and 40 a non-object source.

The invention claimed is:

1. A noise identifying apparatus, comprising:
   a sound detection means, including a plurality of microphones and/or particle velocity sensors;
   a sound source direction specifying means, specifying an instantaneous direction of a sound source for each unit time on the basis of the result of detection by the sound detection means;
   a variation degree calculating means, calculating a variation degree of a plurality of said instantaneous directions, having been specified by said sound source direction specifying means for a prescribed period, being set longer than said unit time; and
   a non-object noise determining means, determining, on the basis of said variation degree, having been calculated by the variation degree calculating means, the existence/absence of a non-object noise, having influenced the measurement of an object noise, coming from a noise source taken as an object to be measured.

2. The noise identifying apparatus according to claim 1, wherein said non-object noise determining means, upon having determined that there has existed said non-object noise which has influenced the measurement of said object noise, outputs said prescribed period, said variation degree therefor having been calculated as a non-object noise detection period by said variation degree calculating means.

3. The noise identifying apparatus according to claim 1, wherein said sound source direction specifying means specifies a piece of sound pressure information together with said instantaneous direction, while said variation degree calculating means calculates a weighted standard deviation including said piece of sound pressure information as said variation degree.

4. The noise identifying apparatus according to claim 1, wherein said variation degree calculating means generates a distribution map of said instantaneous direction, calculating a correlation coefficient between the map and a reference distribution map, having been previously set, as said variation degree.

5. A noise identifying method, comprising:
   the sound detection step of detecting a sound by a sound detection means, including a plurality of microphones and/or particle velocity sensors; and the determination step of using an information processing apparatus for specifying an instantaneous direction of a sound source for each unit time on the basis of the result of detection by said sound detection step; calculating a variation degree of a plurality of said instantaneous directions, having been specified by specifying an instantaneous direction of said sound source for a prescribed period, being set longer than said unit time; and on the basis of said variation degree, having been calculated, determining the existence/absence of a non-object noise, having influenced the measurement of an object noise, coming from a noise source taken as an object to be measured.

6. The noise identifying apparatus according to claim 2, wherein said sound source direction specifying means specifies a piece of sound pressure information together with said instantaneous direction, while said variation degree calculating means calculates a weighted standard deviation including said piece of sound pressure information as said variation degree.

7. The noise identifying apparatus according to claim 2, wherein said variation degree calculating means generates a distribution map of said instantaneous direction, calculating a correlation coefficient between the map and a reference distribution map, having been previously set, as said variation degree.

* * * * *